US012596676B2

(12) United States Patent
Ott et al.

(10) Patent No.: US 12,596,676 B2
(45) Date of Patent: Apr. 7, 2026

(54) RECORDS RETENTION MANAGEMENT

(71) Applicant: MASTERCARD INTERNATIONAL INCORPORATED, Purchase, NY (US)

(72) Inventors: Haley Ott, Norwalk, CT (US); Alex Valensi, New York, NY (US); David Brawley, Chesterfield, MO (US); Dorian Tomace, Richmond Heights, MO (US); Joseph Beyer, Lake St. Louis, MO (US); William Watson, St. Charles, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/427,802

(22) Filed: Jan. 30, 2024

(65) Prior Publication Data

US 2025/0245195 A1 Jul. 31, 2025

(51) Int. Cl.
*G06F 7/00* (2006.01)
*G06F 16/11* (2019.01)
*G06F 16/28* (2019.01)

(52) U.S. Cl.
CPC .......... *G06F 16/125* (2019.01); *G06F 16/287* (2019.01)

(58) Field of Classification Search
CPC .............................. G06F 16/125; G06F 16/287
See application file for complete search history.

(56) References Cited

U.S. PATENT DOCUMENTS

| | | | |
|---|---|---|---|
| 8,452,444 B1* | 5/2013 | Low | G06Q 10/00 |
| | | | 700/215 |
| 9,912,752 B1* | 3/2018 | Davis | G06F 16/2365 |
| 11,061,613 B2 | 7/2021 | Baptist et al. | |
| 12,072,868 B1* | 8/2024 | Opincariu | G06F 16/2379 |
| 2002/0010708 A1* | 1/2002 | McIntosh | G06F 16/93 |
| | | | 715/201 |

(Continued)

OTHER PUBLICATIONS

Unknown, "Use retention labels to manage the lifecycle of documents stored in SharePoint", Microsoft 365 licensing guidance for security & compliance, published Mar. 28, 2023, 15 pages.

(Continued)

*Primary Examiner* — Mohammed R Uddin
(74) *Attorney, Agent, or Firm* — Barta Jones, PLLC

(57) ABSTRACT

Examples provide record retention to content items in a content management system. The system identifies a content item stored in a content items database and displays a user interface (UI) that includes a list for a categorization criterion. User input is received from the UI indicating a user selection for the first categorization criterion. A retention mapping schedule maps the criterion options to retention labels of a retention schedule. A retention label for the content item is determined based on the first user selection and the retention mapping schedule, the retention label being defined in the retention schedule and having an expiration duration defining how long content items marked with the retention label are retained. The retention label is stored as metadata for the content item, and the content item is deleted after an expiration duration of the content item has elapsed.

20 Claims, 19 Drawing Sheets

(56)  References Cited

U.S. PATENT DOCUMENTS

| | | | | |
|---|---|---|---|---|
| 2007/0271308 A1* | 11/2007 | Bentley | ................... | G06F 16/93 |
| 2008/0109808 A1* | 5/2008 | Wing | ..................... | G06F 16/93 |
| | | | | 718/102 |
| 2011/0153578 A1* | 6/2011 | Pogodin | ................ | G06Q 10/10 |
| | | | | 707/694 |
| 2011/0153579 A1* | 6/2011 | Paknad | ................. | G06Q 10/10 |
| | | | | 707/694 |
| 2014/0236910 A1* | 8/2014 | Owuor | ................... | G06F 16/23 |
| | | | | 707/694 |
| 2015/0134628 A1* | 5/2015 | Hu | .......................... | G06F 16/21 |
| | | | | 707/694 |
| 2017/0286221 A1* | 10/2017 | Azogui | .................. | G06F 3/064 |
| 2018/0075138 A1* | 3/2018 | Perram | .................. | G06F 16/93 |
| 2018/0276232 A1* | 9/2018 | Dhanasekaran | ........ | G06F 16/25 |
| 2018/0341473 A1* | 11/2018 | Watt, Jr. | .............. | G06F 21/6218 |
| 2018/0349269 A1* | 12/2018 | Garg | ..................... | G06F 3/0649 |
| 2019/0266256 A1* | 8/2019 | Dudani | ................. | G06F 16/162 |
| 2019/0294707 A1* | 9/2019 | Ramaswamy | ......... | G06Q 10/10 |
| 2022/0229805 A1* | 7/2022 | Chakeres | ............ | G06F 11/2094 |
| 2024/0012797 A1* | 1/2024 | Jagasia | ................. | G06F 16/219 |
| 2024/0273186 A1* | 8/2024 | George | ............... | G06F 21/6218 |
| 2024/0386054 A1* | 11/2024 | Wouhaybi | ............. | G06F 16/901 |

OTHER PUBLICATIONS

Unknown, "Set the retention time", NetApp.com, published Mar. 20, 2023, https://docs.netapp.com/us-en/ontap/snaplock/set-retention-period-task.html#set-the-default-retention-period, 18 pages.

Unknown, "Records Retentiondata Automationcompliance Solution", Document Logistix, https://document-logistix.com/document-management-software-system/retention/records-retention-policy-automation/, copyright 2022, 17 pages.

Unknown, "Create and configure your retention policies", AO Docs Support, published Mar. 21, 2023, https://support.aodocs.com/hc/en-us/articles/360015484772-Create-and-configure-your-retention-policies, 8 pages.

Unknown, "Record Retention Policy", The GitLab Handbook, copyright 2023, https://handbook.gitlab.com/handbook/legal/record-retention-policy/, 6 pages.

* cited by examiner

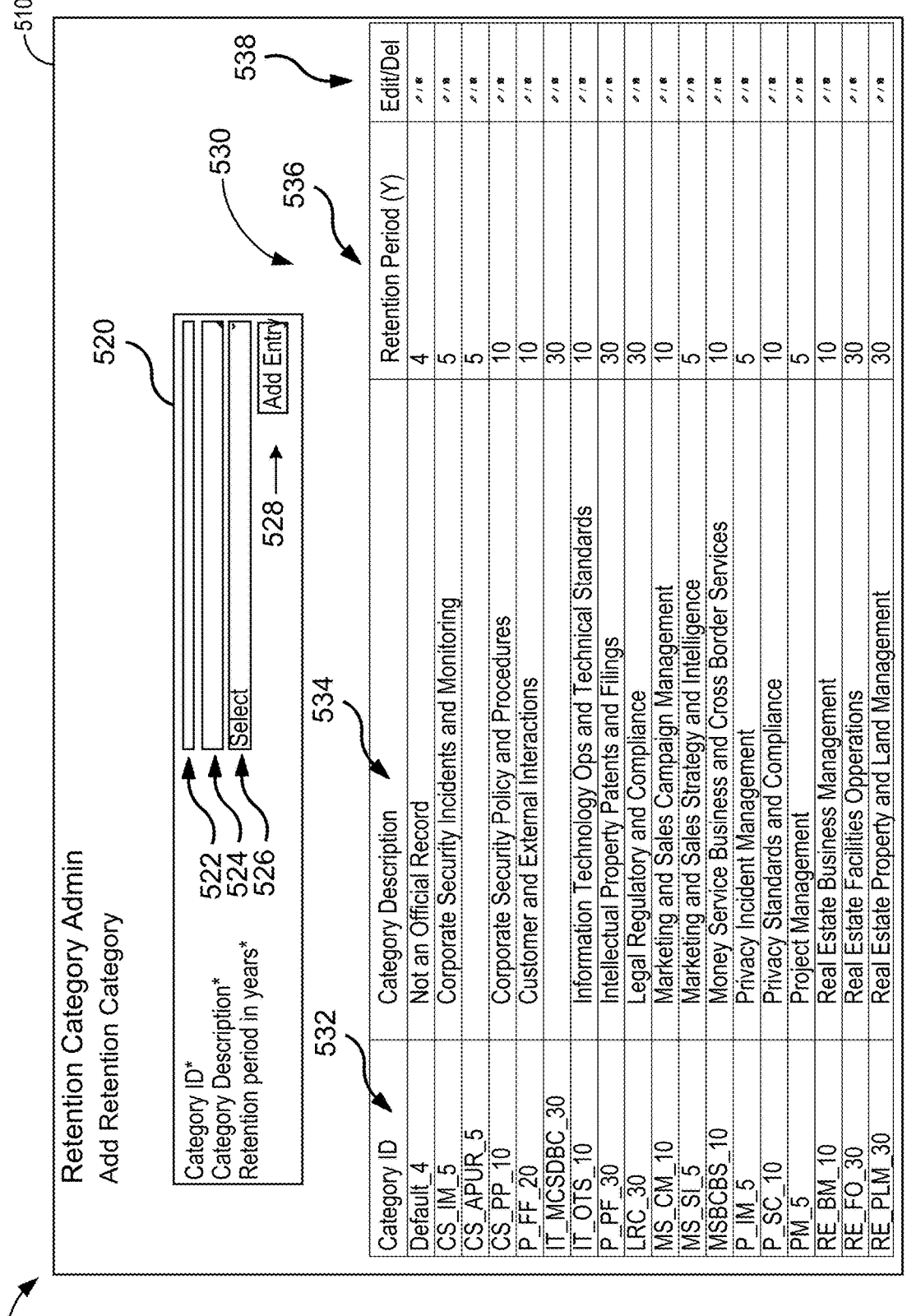

Retention Category Admin
Add Retention Category

Category ID*
Category Description*
Retention period in years*

Select
528 → Add Entry 520
522
524
526
530
536
538
532
534

| Category ID | Category Description | Retention Period (Y) | Edit/Del |
|---|---|---|---|
| Default_4 | Not an Official Record | 4 | ✎ 🗑 |
| CS_IM_5 | Corporate Security Incidents and Monitoring | 5 | ✎ 🗑 |
| CS_APUR_5 | | 5 | ✎ 🗑 |
| CS_PP_10 | Corporate Security Policy and Procedures | 10 | ✎ 🗑 |
| P_FF_20 | Customer and External Interactions | 10 | ✎ 🗑 |
| IT_MCSDBC_30 | | 30 | ✎ 🗑 |
| IT_OTS_10 | Information Technology Ops and Technical Standards | 10 | ✎ 🗑 |
| P_PF_30 | Intellectual Property Patents and Filings | 30 | ✎ 🗑 |
| LRC_30 | Legal Regulatory and Compliance | 30 | ✎ 🗑 |
| MS_CM_10 | Marketing and Sales Campaign Management | 10 | ✎ 🗑 |
| MS_SI_5 | Marketing and Sales Strategy and Intelligence | 5 | ✎ 🗑 |
| MSBCBS_10 | Money Service Business and Cross Border Services | 10 | ✎ 🗑 |
| P_IM_5 | Privacy Incident Management | 5 | ✎ 🗑 |
| P_SC_10 | Privacy Standards and Compliance | 10 | ✎ 🗑 |
| PM_5 | Project Management | 5 | ✎ 🗑 |
| RE_BM_10 | Real Estate Business Management | 10 | ✎ 🗑 |
| RE_FO_30 | Real Estate Facilities Opperations | 30 | ✎ 🗑 |
| RE_PLM_30 | Real Estate Property and Land Management | 30 | ✎ 🗑 |

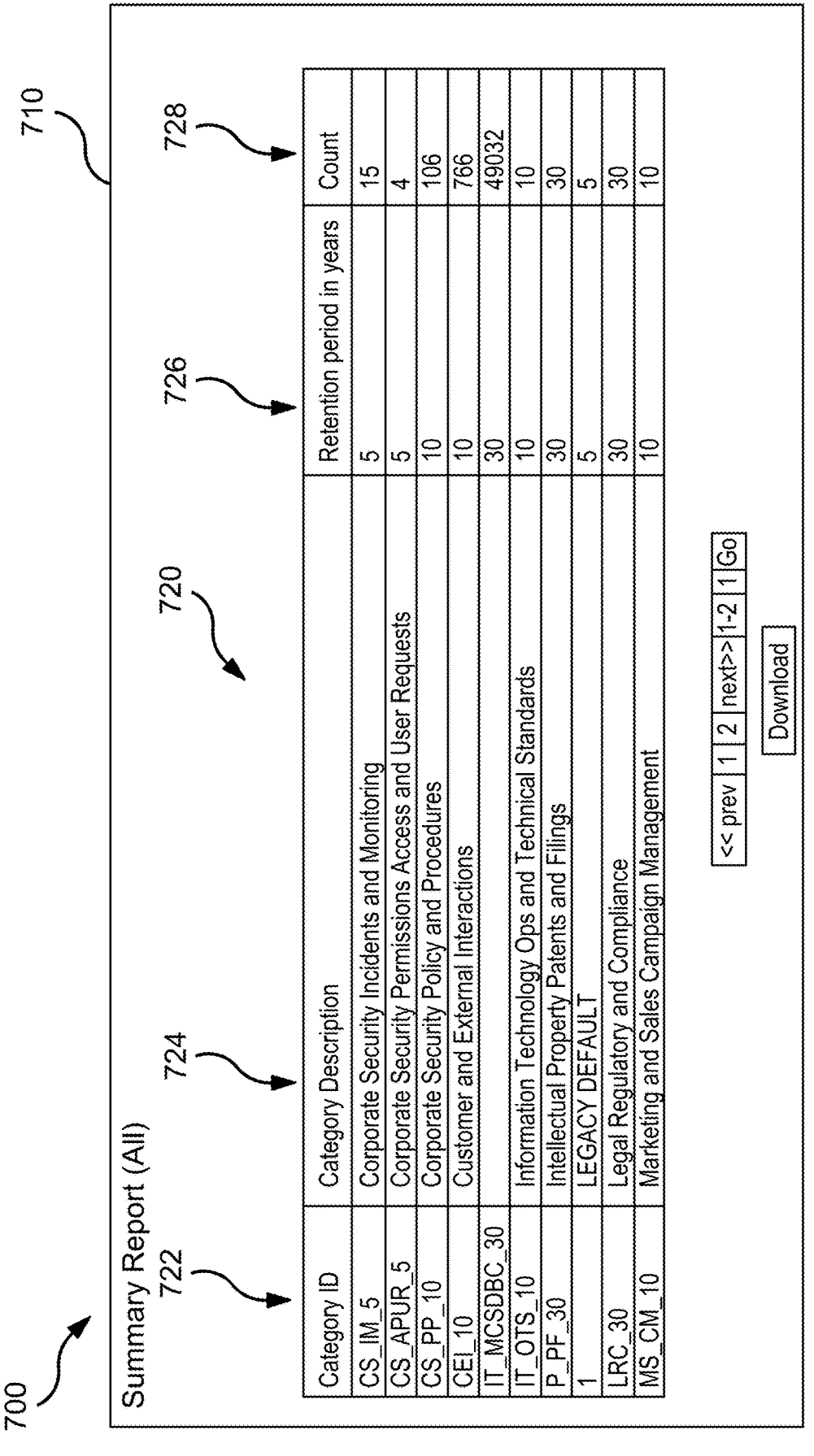

Summary Report (All)

| Category ID | Category Description | Retention period in years | Count |
|---|---|---|---|
| CS_IM_5 | Corporate Security Incidents and Monitoring | 5 | 15 |
| CS_APUR_5 | Corporate Security Permissions Access and User Requests | 5 | 4 |
| CS_PP_10 | Corporate Security Policy and Procedures | 10 | 106 |
| CEI_10 | Customer and External Interactions | 10 | 766 |
| IT_MCSDBC_30 | Information Technology Ops and Technical Standards | 30 | 49032 |
| IT_OTS_10 | Information Technology Ops and Technical Standards | 10 | 10 |
| P_PF_30 | Intellectual Property Patents and Filings | 30 | 30 |
| 1 | LEGACY DEFAULT | 5 | 5 |
| LRC_30 | Legal Regulatory and Compliance | 30 | 30 |
| MS_CM_10 | Marketing and Sales Campaign Management | 10 | 10 |

<< prev | 1 | 2 | next>> | 1-2 | 1 | Go

Download

FIG. 7

Detailed Report (Expiring)

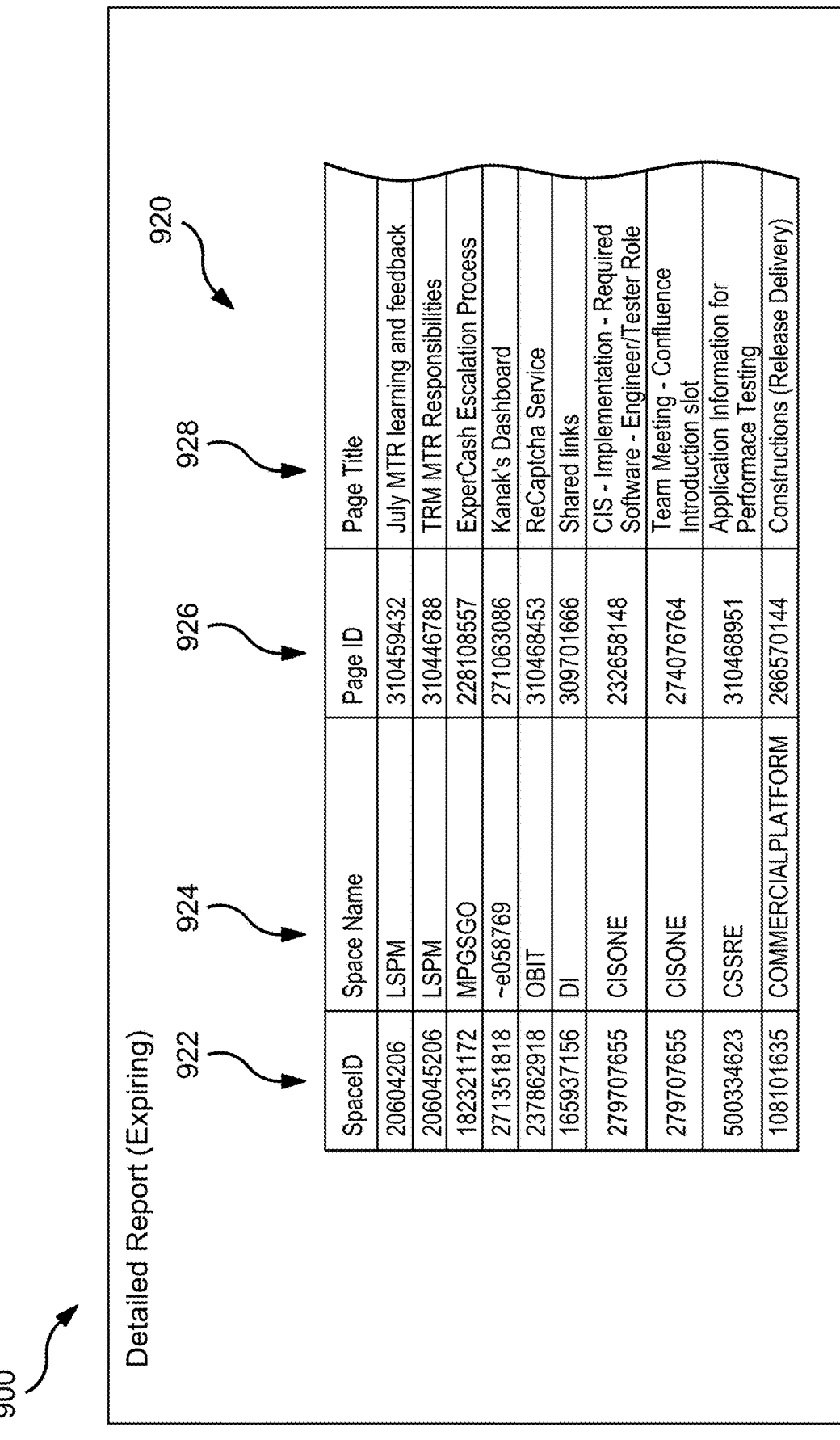

| SpaceID | Space Name | Page ID | Page Title |
|---|---|---|---|
| 20604206 | LSPM | 310459432 | July MTR learning and feedback |
| 206045206 | LSPM | 310446788 | TRM MTR Responsibilities |
| 182321172 | MPGSGO | 228108557 | ExperCash Escalation Process |
| 271351818 | ~e058769 | 271063086 | Kanak's Dashboard |
| 237862918 | OBIT | 310468453 | ReCaptcha Service |
| 165937156 | DI | 309701666 | Shared links |
| 279707655 | CISONE | 232658148 | CIS - Implementation - Required Software - Engineer/Tester Role |
| 279707655 | CISONE | 274076764 | Team Meeting - Confluence Introduction slot |
| 500334623 | CSSRE | 310468951 | Application Information for Performace Testing |
| 108101635 | COMMERCIALPLATFORM | 266570144 | Constructions (Release Delivery) |

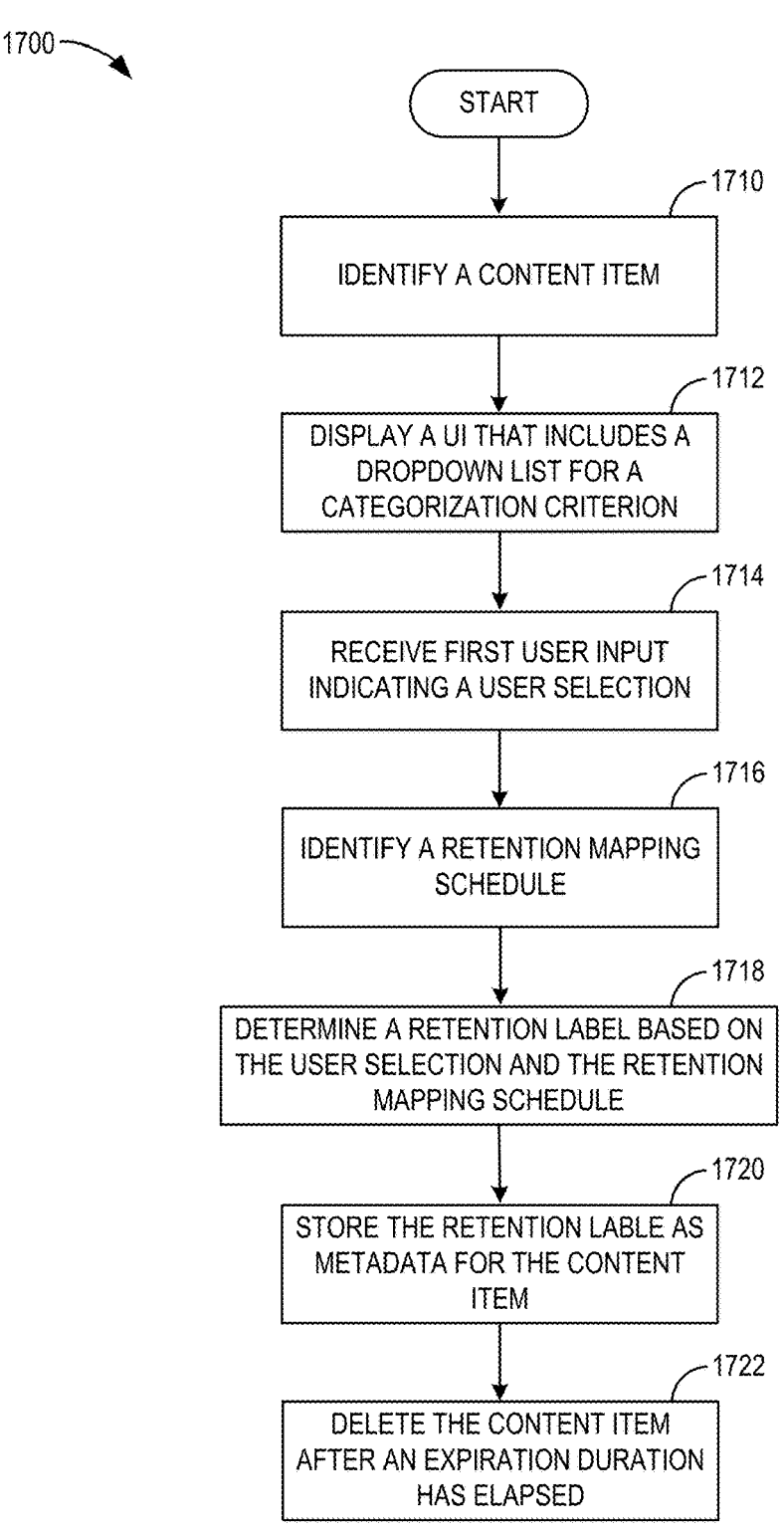

START

IDENTIFY A CONTENT ITEM ⌐1710

DISPLAY A UI THAT INCLUDES A DROPDOWN LIST FOR A CATEGORIZATION CRITERION ⌐1712

RECEIVE FIRST USER INPUT INDICATING A USER SELECTION ⌐1714

IDENTIFY A RETENTION MAPPING SCHEDULE ⌐1716

DETERMINE A RETENTION LABEL BASED ON THE USER SELECTION AND THE RETENTION MAPPING SCHEDULE ⌐1718

STORE THE RETENTION LABLE AS METADATA FOR THE CONTENT ITEM ⌐1720

DELETE THE CONTENT ITEM AFTER AN EXPIRATION DURATION HAS ELAPSED ⌐1722

RECORDS RETENTION MANAGEMENT

BACKGROUND

Collaborative software systems help people work together on common tasks. These collaborative software systems are often deployed by companies to help their employees team together, allowing groups of users to share documents, track projects, and communicate together, amongst many other functionalities. Collaborative software systems often include a content management system that is used to store and retain documents, search and navigate through documents and workspaces, and facilitate sharing of documents amongst groups of users.

SUMMARY

Some examples provide a content management system for adding record retention to content items. The content management system includes: a content items database storing content items; at least one processor; and at least one memory comprising computer-readable instructions, the at least one processor, the at least one memory and the computer-readable instructions configured to cause the at least one processor to: identify a content item stored in the content items database, the content item including content data and content metadata; cause a user interface (UI) to be displayed on a user device, the UI includes a first list for a first categorization criterion, the first categorization criterion including one or more first criterion options selectable via the first list; receive first user input from the UI indicating a first user selection for the first categorization criterion, the first user selection being one of the one or more first criterion options; identify a retention mapping schedule, the retention mapping schedule maps the one or more first criterion options to retention labels of a retention schedule; determine a retention label for the content item based on the first user selection and the retention mapping schedule, the retention label being defined in the retention schedule and having an expiration duration defining how long content items marked with the retention label are retained; store the retention label as metadata for the content item; and retain the content item until after an expiration duration of the content item has elapsed.

Other examples provide a method for adding record retention to content items. The method includes identifying a content item stored in a content items database; causing a user interface (UI) to be displayed on a user device, the UI includes a first list for a first categorization criterion, the first categorization criterion including one or more first criterion options selectable via the first list; receiving first user input from the UI indicating a first user selection for the first categorization criterion, the first user selection being one of the one or more first criterion options; identifying a retention mapping schedule, the retention mapping schedule maps the one or more first criterion options to retention labels of a retention schedule; determining a retention label for the content item based on the first user selection and the retention mapping schedule, the retention label being defined in the retention schedule and having an expiration duration defining how long content items marked with the retention label are retained; storing the retention label as metadata for the content item; and deleting the content item after an expiration duration of the content item has elapsed.

Still other examples provide a computer storage medium having computer-executable instructions that, upon execution by a processor of a computer, cause the processor to at least: identify a content item stored in a content items database; cause a user interface (UI) to be displayed on a user device, the UI includes a first list for a first categorization criterion, the first categorization criterion including one or more first criterion options selectable via the first list; receive first user input from the UI indicating a first user selection for the first categorization criterion, the first user selection being one of the one or more first criterion options; identify a retention mapping schedule, the retention mapping schedule maps the one or more first criterion options to retention labels of a retention schedule; determine a retention label for the content item based on the first user selection and the retention mapping schedule, the retention label being defined in the retention schedule and having an expiration duration defining how long content items marked with the retention label are retained; store the retention label as metadata for the content item; and delete the content item after an expiration duration of the content item has elapsed This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 5 is an exemplary screenshot of a UI that allows admins to add, edit, or delete retention labels from the retention schedule.

FIG. 7 is an exemplary screenshot of a UI that allows users or admins to view a summary report that shows how many content items are assigned to particular retention labels.

FIG. 17 is a flowchart of an exemplary method for adding record retention to content items.

Corresponding reference characters indicate corresponding parts throughout the drawings. Any of the figures may be combined into a single example or embodiment.

DETAILED DESCRIPTION

Figure 1:
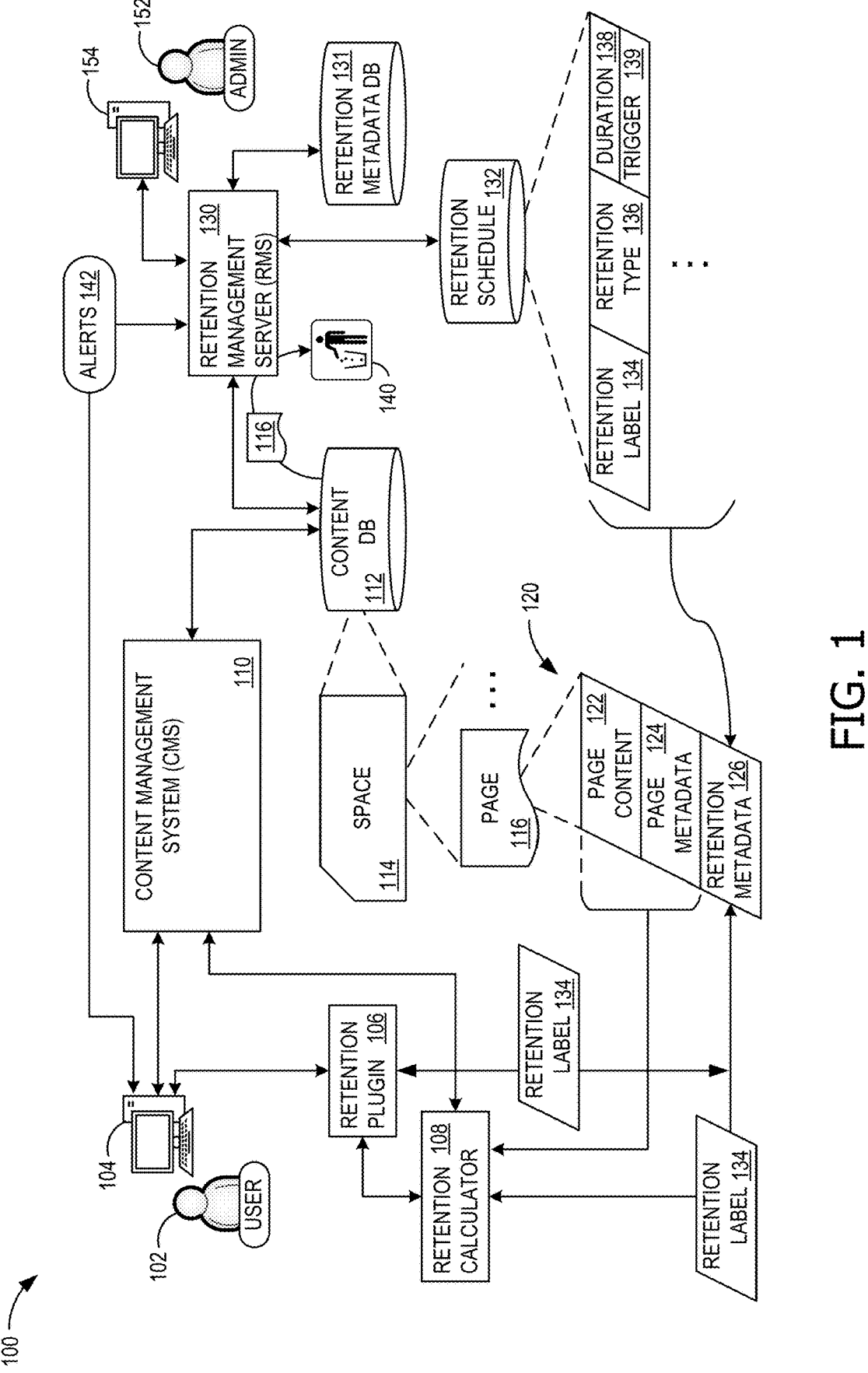
FIG. 1 is an exemplary block diagram illustrating a system for providing retention management functionality for content items.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . ." For brevity and clarity of presentation, this implied leading clause is not repeated ad nauseum.

As part of data governance needs, a business entity may be mandated to retain certain types of documents for certain periods of time, or for a period of time after certain events occur. For example, documents related to financial statements of the business may be legally mandated to be maintained for a period of seven to ten years (e.g., for auditing purposes). Legal documents related to a particular litigation matter may be required to be retained during the legal action and beyond. Further, the business may wish to maintain certain types of documents based on their own internal uses. For example, a business may wish to retain marketing and sales strategy and intelligence documents for a number of years to allow a historical look into recent strategies of the business. As such, businesses may establish a document retention policy that defines how long documents are retained based on the type of document. This document retention policy thus defines when a particular type of document can be removed (e.g., after the retention time has elapsed from the time a particular document was created).

In an age where most documents now reside electronically in content management systems, it can be technically advantageous to electronically implement a document retention policy within the content management system. However, in order to apply a particular retention strategy to particular types of electronic documents, the electronic documents may need to be labeled or otherwise categorized before a document retention policy can be effectively implemented against those documents.

Referring to the figures, examples of the disclosure enable a document retention policy to be applied to electronic content items (e.g., electronic records, files, documents, pages of composite content, or the like) that are managed by a content management system (CMS). In some examples, the CMS does not natively support document retention functionality for the managed content. As such, a retention management system (RMS) is implemented in conjunction with the CMS. The RMS establishes a retention schedule that defines a set of retention labels that can be assigned to content items, along with a configurable retention duration for each particular retention label. The RMS provides a retention plugin (e.g., a browser plugin) that allows users of the CMS to apply retention labels to their documents stored within the CMS.

In some examples, the CMS is a business collaboration software system such as Confluence (Atlassian Corporation of Sydney, Australia), which provides content management features for documents, amongst other functions. Under such a system, content is organized into hierarchical structures of Spaces and Pages. Spaces act as top-level containers, serving as a primary way to organize and categorize content. Pages are individual components of content that are provided within Spaces, and are used to contain text, images, tables, documents, attachments, meeting notes, multimedia content, and other such digital content that may be useful to share amongst teams in an enterprise environment. As such, the example RMS allows users to attach retention labels to Spaces, Pages, or the content items contained therein. These retention labels are stored as metadata associated with a particular content item, Page, or Space. The RMS, for example, uses these retention labels to evaluate when to delete the content items or otherwise allow the content items to be deleted (e.g., based on the retention schedule).

In some examples, the RMS provides a retention calculator that assists users in determining what retention label to apply to particular content items. The retention calculator prompts the user with a set of questions related to the type of document to be labeled. From these answers, the retention calculator identifies what retention label(s) may apply. The retention calculator may display a list of suggested retention labels to the user or may automatically apply one or more retention labels based on the user-provided answers.

The conventional computing device operates in an unconventional manner by applying retention management functionality to content items managed by a content management system. In this manner, the computing device is used in an unconventional manner and allows users to control how long content items are retained and when content items are deleted, thereby improving the functioning of the underlying computing device at least because persistent storage consumed by content items can be more effectively managed. Storage is conserved through this retention management, allowing the computing device to delete content items that do not need to be retained, thereby reducing the amount of storage needed.

FIG. 1 is an exemplary block diagram illustrating a system 100 for providing retention management functionality for content items 120. In the example, the system 100 includes a content management server (CMS) 110 that manages content items 120 on behalf of users 102. The CMS 110 may, for example, be a subsystem of a collaborative software system, groupware, project management system, workflow system, knowledge management system, or other system that includes document management or content management (not separately shown). The CMS 110 stores content items 120 in a content database (DB) 112 and provides access to those content items 120 to users 102 via their user computing devices 104 (e.g., via web browser, graphical user interface, mobile interface, or other client/ server interface between the user computing device 104 and CMS 110).

In the example, content managed by the CMS 110 is organized into hierarchical structures of Spaces 114 and Pages 116. Spaces 114 act as top-level containers, serving as a primary way to organize and categorize content. Pages 116 are individual components of content that are provided within Spaces 114, and are used to contain text, images, tables, documents, attachments, meeting notes, direct or group messaging content, multimedia content, and other such digital content that may be useful to share amongst teams in an enterprise environment. Spaces 114 and Pages 116 can be shared amongst multiple users 102 of the CMS 110 and may allow collaborative features such as comment-ing, page permissioning, group editing, and the like. Pages 116 can also include composite content (e.g., multiple documents, attachments, or other digital content) and may include other Pages 116 (e.g., child pages). While these examples illustrate content items 120 in the form of Pages 116 in Spaces 114, it should be understood that the retention functionalities described herein may similarly be applied to other types or structures of content items 120.

In these examples, each Page 116 is treated as a content item 120 within the content DB 112. Each page 116 (e.g., each content item 120) includes page content 122 and page metadata 124, where the page content 122 represents the digital content that is of interest to the users 102, and where the page metadata 124 is data used to manage and track aspects of the page 116. Page content 122 can include any of the various types of content mentioned above. Page metadata 124 can include, for example, page title, page ID (e.g., a unique identifier for each Page 116 in the content DB 112), a web address (e.g., uniform resource locator (URL)) of the Page 116, a page history or version information (e.g., a record of changes made to the Page 116, including author, date, summary of the edit, or the like), page permissions (e.g., who has access to view, edit, or comment on the Page 116), page relationships (e.g., parent or child relationships to other Spaces 114 or Pages 116), attachment data (e.g., details about any content attached to the Page 116), page status, page creation or edit dates, or the like.

As mentioned above, the CMS 110 may not natively support some or all of the retention functionality described herein. Accordingly, in this example, the system 100 also includes a retention management server (RMS) 130 that provides retention functionality for the content items 120 managed by the CMS 110. Such document retention functionality can include, for example, labelling content items 120 for particular types of retention (e.g., time-based retention, event-based retention), orchestrating when a particular content item 120 must be preserved or is allowed to be deleted, when the content item 120 is automatically deleted, or providing various interface features that assist users 102 in applying labels to content items 120.

In examples, the RMS 130 manages a retention schedule 132 for the system 100 and, more specifically, for management of the content items 112. The retention schedule 132 is a configurable data structure that identifies what types of document retentions are provided and enforced by the RMS 130. Types of document retention can include, for example, time-based retention (e.g., keeping content items 120 for a particular length of time) or event-based retention (e.g., keeping content items 120 until after some particular event has occurred).

In time-based retention, content items 120 are maintained for some particular duration (a "retention duration"). Retention durations can include any defined duration of time (e.g., in days, months, years, or combinations thereof), such as 3 years, 5 years, 7 years, 10 years, or the like. For any given content item 120, the retention duration tolls from a "retention start date" specific to that content item 120, and based on a "tolling start type." Tolling start types can include, for example, creation date of the content item 120 (e.g., the date/time at which a document was originally created, loaded into the content DB 112, added into the CMS 110, or the like), or last modified date of the content item 120 (e.g., the most recent date/time at which the content item 120 was edited or otherwise changed). Under time-based retention, an "expiration timer" for a given content item can be described as tolling from the retention start date of that content item 120 and for the retention duration, leading to an "expiration date" of that content item 120.

In event-based retention, content items 120 are maintained until the occurrence of some event (a "retention event" or "retention trigger"). Some types of retention events can include, for example, litigation holds (e.g., where documents are legally required to be saved until after a litigation matter has concluded), managerial holds or user-initiated holds (e.g., where management or other users, such as project managers or team leaders, retain content items 120 until a time of their choosing). Under event-based retention, such labeled content items 120 are said to be retained pending the occurrence of the retention event.

These retention types can also include soft enforcement or hard enforcement. Under hard enforcement, the RMS 130 does not allow users 102 to manually delete the content item 120 until after the retention criteria are satisfied. For example, for content items 120 labeled under a hard enforced, time-based retention type, users 102 are not allowed to manually delete content items 120 until after the retention duration has elapsed. For content items 120 labeled under a hard enforced, event-based retention type, users 102 are not allowed to manually delete content items 120 until after the associated event trigger has been identified by the RMS 130. Under soft enforcement, the RMS 130 allows users 102 to manually delete content items 120 even if the retention criteria have not yet been satisfied, though the RMS 130 may automatically delete the content items 120 after the retention criteria are satisfied.

In the example shown in FIG. 1, the retention schedule 132 includes a set of retention labels 134 that are used to define various retention criteria for the content items 120. Each retention label 134 in the retention schedule 132 is a unique identifier (e.g., a category ID or the like) that can be assigned to content items 120 within the content DB 112. Each retention label 134 includes a retention type 136 (e.g., time/event based, hard/soft, tolling start type, and any combination thereof). For time-based retention types, the retention label 134 also includes a retention duration (or just "duration") 138. For event-based retention types, the retention label 134 also includes a retention trigger definition (or just "trigger") 139. Each retention label 134 may also include other data (not shown in FIG. 1) such as a title or description (e.g., "Corporate Security Incidents and Monitoring," "Intellectual Property Patents and Filings," "Legal Regulatory and Compliance"), notification settings (e.g., how and when to send alerts 142), and deletion settings (e.g., how to automatically handle deletions).

Each of the retention labels 134 defined in the retention schedule 132 can be configured by administrators ("admins") 152 of the system 100, the CMS 110, or the RMS 130 (e.g., via an administrative user interface displayed via an administrative computing device 154). For example, an admin 152 may define a new retention label 134 of "CS IM 5" that is to be used for retention of content items 120 associated with corporate security incidents and monitoring. This example retention label 134 may include a retention type 136 attributes of "time-based+hard+creation date" and with a duration 138 of 5 years. As such, content items 120 that have this example retention label 134 will be retained for 5 years from the creation date of that content item 120, and the RMS 130 will prohibit manual deletion of that content item 120 by users 102 prior to the expiration of that content item 120. Similarly, many such retention labels 134 can be defined and configured within the retention schedule 132.

The RMS 130, in this example, provides a retention plugin 106 (e.g., a browser plugin) that allows users 102 of the CMS 110 to apply retention labels 134 to the content items 120 stored within the CMS 110. In some examples, the retention plugin 106 provides a graphical user interface (GUI) that communicates with the RMS 130 to facilitate user selection and assignment of retention label(s) 134 to a particular content item 120. For example, the user 102 (e.g., a user 102 assigned as the "owner" of this particular Page 116 or Space 114) may be editing a given Page 116 and may select an "Edit Retention" function within the user interface. As such, the retention plugin 106 may request a list of retention labels 134 from the RMS 130 (e.g., the retention labels 134 defined in the retention schedule 132) and may display these retention labels 134 (e.g., display their title or description) in a selection list. This selection list allows the user 102 to select one or more of the retention labels defined in the retention schedule 132 for assignment to this content item 120.

Upon saving this retention label selection, the RMS 130 assigns the selected retention label(s) 134 to the Page 116 as retention metadata 126. In some examples, this retention metadata 126 may be included as metadata stored in the content DB 112 (e.g., along with the page content 122 and page metadata 124 associated with the page). For example, the selected retention label(s) 134 for the given Page 116 may be added as additional labels to the Page 116 within the page metadata 124, and such retention labels 134 may not be understood or usable by the CMS 110 but can be accessed and used by the RMS 130. In other examples, the retention metadata 126 may be stored in a separate database managed by the RMS 130 (e.g., retention metadata DB 131, where each record includes at least a unique page ID or space ID of the Page 116 or Space 114 and the one or more selected retention labels 134).

In some examples, the RMS 130 provides a retention calculator 108 that can be activated by the user 102 to help identify what retention label(s) 134 to assign to their particular content item 120. The retention calculator 108 guides the user 102 through a few questions regarding the nature of the content item 120, probing the user 102 for information such as a business function category for the content item 120 (e.g., "Accounting," "Corporate Governance," "Corporate Security", and the like), a record category for the content item 120 (e.g., from a list of various types of records common to the selected business function), and possibly a regional identifier for the content item 120 (e.g., any particular region or jurisdiction that may have specific document retention restrictions).

Once the user 102 has selected answers for each of the queries, the retention calculator 108 automatically identifies one or more retention labels 134 based on the user-selected answers. In some examples, these identified retention labels 134 may be automatically assigned to the content item 120. In other examples, the identified retention labels 134 may be displayed to the user 102 and the user 102 may be allowed to add, change, or delete one or more retention labels 134 before the retention labels 134 are applied to the content item 120. FIG. 11 to FIG. 16 illustrate an example user interface for the retention calculator 108.

These assignments of retention labels 134, whether via the retention plugin 106 or the retention calculator 108, associates the content item 120 (e.g., the Page 116, the Space 114) with one or more retention labels 134 via the retention metadata 126. For any given content item 120, the RMS 130 uses the retention label(s) identified in the retention metadata 126 as a lookup index into the retention schedule 132 to identify the associated retention type 136 and duration 138 or trigger 139. This reference into the retention schedule 132 allows the RMS 130 to calculate a specific expiration time for the content item 120 (e.g., for time-based retention types) or to determine whether the trigger 139 has occurred (e.g., for event-based retention types).

As such, the application of retention labels 134 to Pages 116 or Spaces 114 informs aspects of how the CMS 110 or the RMS 130 will allow these content items 120 to be deleted. More specifically, during operation, the RMS 130 may prohibit the deletion of a given content item 120 if that content item 120 is associated with a retention label 134 that has a "hard" retention attribute and either has a duration 138 that has not yet expired (e.g., based on the criteria relative to that particular content item 120) or that has a trigger 139 that has not yet occurred. In cases where multiple retention labels 134 are assigned to a particular content item 120, deletion may be prohibited if the retention criteria of any one or more of the assigned retention labels 134 are not satisfied.

In some examples, the RMS 130 manages automatic deletion of content items 120 from the content DB 112 based on the retention schedule 132 and assigned retention labels 134. More specifically, and for each particular content item 120, the RMS 130 periodically checks the retention metadata 126 of that content item 120 and determines whether the duration 138 of all of the assigned retention labels 134 have elapsed (e.g., based on creation date, last edit date, or the like, in the case of time-based retention labels 134) or whether the trigger event 139 has occurred (e.g., in the case of event-based retention labels 134). If the retention criteria for all of the retention labels 134 assigned to the content item 120 are satisfied, then the content item 120 may be automatically deleted by the RMS 130. As such, the RMS 130 can be configured to perform automatic deletion of content items 120.

In some examples, 'deletion' of content items 120 (e.g., deletion of Page 116 at operation 140) includes a permanent deletion of the content item 120 from the content DB 120. In other examples, 'deletion' of content items 120 can be performed in a multi-stage approach in which the content item 120 may first be marked as 'trash,' and may later be permanently deleted (e.g., either automatically after a pre-configured amount of time as 'trash,' after prompting the owning user for permission to delete the content item 120). In situations where multiple retention labels 134 are assigned to a given content item, it is the strictest label 134 that dictates when deletion of content items can occur (e.g., the longest time-based label 134, the satisfaction of the latest trigger 139).

In some examples, the RMS 130 provides alert messages (or just "alerts") 138 to users 102 regarding retention data associated with content items 120. For example, during the lifetime of content items 120, the RMS 130 may enforce retention labeling of content items 120 within the content DB 112, prompting creators, editors, or owners of content items 120 to add at least one retention label 134 to their content items 120. For example, sometime after a particular Page 116 or Space 114 is created but does not yet have any assigned retention labels 134, the RMS 130 may prompt a user 102 that is assigned as a focal or owner of that content item 120 with an alert 142 that the content item 120 has no retention labels 134.

In some examples, alerts 142 may be sent to users 102 based on deletions scheduled for content items 120 (e.g., to give the users 102 a chance to preserve the content items 120, if desired). The RMS 130 may send an alert 142 at a predetermined time before the retention date for the content item 120 elapses (e.g., before the content item 120 is marked as 'trash' or before the content item 120 is permanently deleted). The RMS 130 may send an alert 142 when a content item 120 is marked as 'trash,' thus giving the user 102 a period of time to preserve the file before automatic deletion occurs.

Alerts 142 can be sent to users 102 at various times, upon various trigger events, via various delivery methods, and to various stakeholders for particular content items 120, any of which can be applied to all content items 120 or customized for each particular retention label 134. For example, alert times or an alert schedule for alerts 142 can be configured in the RMS 130 defining when alerts 142 are sent. Trigger conditions can be defined for when alerts 142 are sent to users 102. Delivery methods for alerts 142 can be via email, via popup messages facilitated by the retention plugin 106 (e.g., when the stakeholder users 102 access the content item 120), text message, instant message, report summaries, or the like. Stakeholders (e.g., the identified recipient users 102 of the alerts 142) for a given Page 116 or Space 114 can include, for example, an original creator or a currently assigned 'owner' of the content item 120 (e.g., as assigned within page metadata 124), a designated focal for the content item 120 (e.g., a project manager associated with the Space 114), or any other user 102 of the CMS 110. Defaults can be defined or configured for any or all of these options for alerts 142, each of which can be overridden by a specific option setting for a specific retention label 134 or retention type 136.

While many of the examples described herein are directed to applying retention labels 134 to pages 116, it should be understood that retention labels 134 can similarly be applied and managed by the RMS 130 on any type of content item (e.g., Spaces 114, individual documents, groups of documents, files, folders, web pages or other online content). In examples where retention labels 134 are applied to nested content items 120 (e.g., in a hierarchical structure of content items, such as the Spaces 114 and Pages 116 paradigm shown in FIG. 1), retention labels 134 of a content item 120 higher in the hierarchy is imputed to lower content items 120 (e.g., child content items in the hierarchy). For example, if a Space 114 is assigned a retention label 134 that saves the Space 114 for ten years, but a child Page 116 of that Space 114 is assigned a retention label 134 that saves the Page 116 for only five years, both retention labels apply to the Page 116. As such, the strictest retention label 134 of that set causes the Page 116 to be retained for ten years, rather than just five years.

Figure 2:
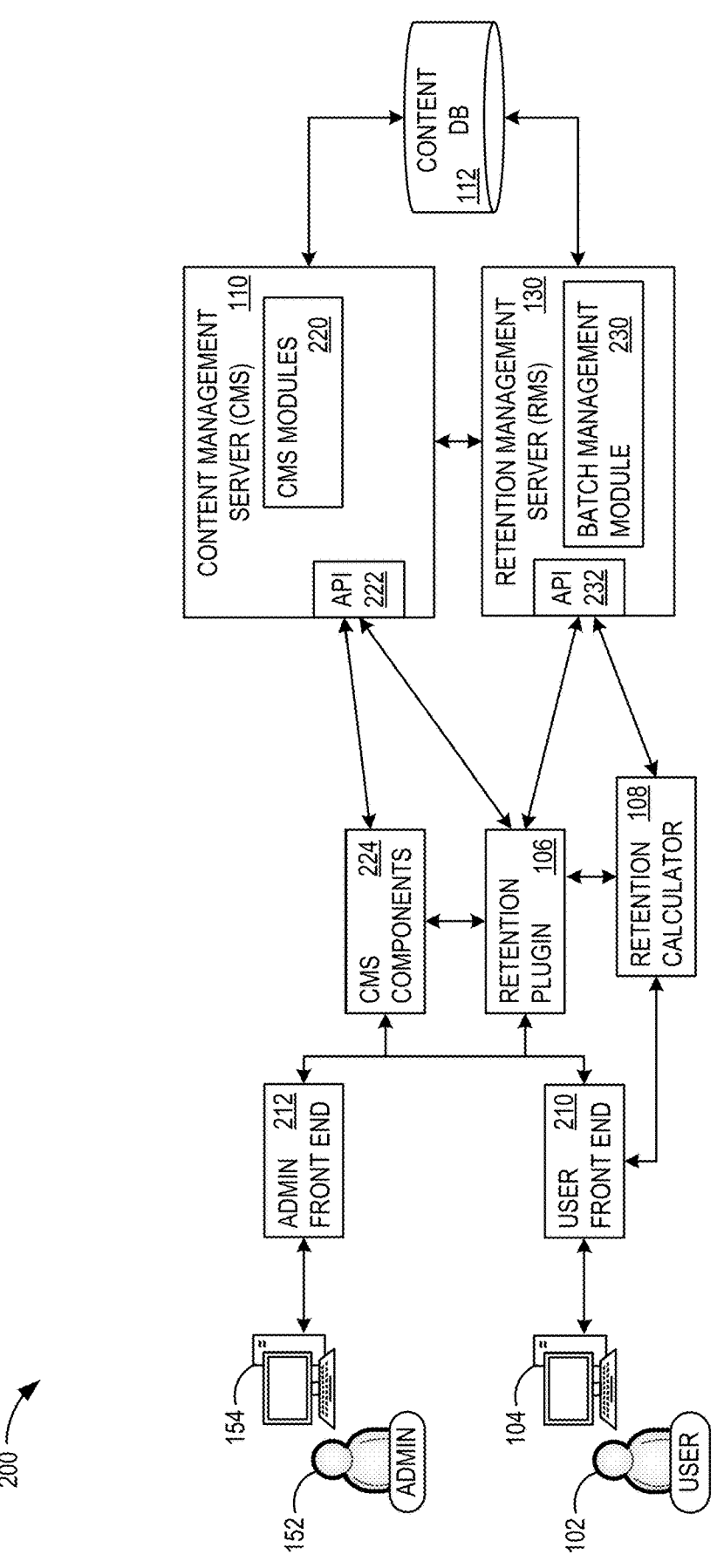
FIG. 2 is an exemplary block diagram illustrating a system for providing retention management functionality for content items.

FIG. 2 is an exemplary block diagram illustrating a system 200 for providing retention management functionality for content items 120. In some examples, the system 200 is similar to the system 100 shown in FIG. 1, and components of system 200 may be used in the system 100. In this example, the system 200 provides an administrative (admin) front end 212 for the admin 152 (e.g., displayed via admin computing device 154) and a user front end 210 for users 102 (e.g., displayed via user computing device 104). The front ends 210, 212 are graphical user interfaces that allow users 102 and admins 152 to access the CMS modules 220 (e.g., via CMS components 224, for aspects of content management functionality), as well as the retention management functionality provided by the RMS 130 (e.g., via retention plugin 106).

The CMS 110 provides an application programming interface (API) 222 that allows CMS components 224 to communicate with the CMS 110 (e.g., for viewing and administering content items 120 of the content DB 112). The RMS 130 also provides an API 232 that allows the retention plugin 106 to and the retention calculator 108 to communicate with the RMS 130 (e.g., for assigning retention labels 134 to content items 120, for administering the retention schedule 132).

FIG. 3 to FIG. 10 are example screenshots of the RMS 130 shown in FIG. 1. In these examples, the screenshots are displayed to the user 102 (e.g., on the user computing device 104) or the admin 152 (e.g., on the admin computing device 154) via the user front end 210 or the admin front end 212 (shown in FIG. 2) by the RMS 130 in conjunction with the retention plugin 106.

Figure 3:
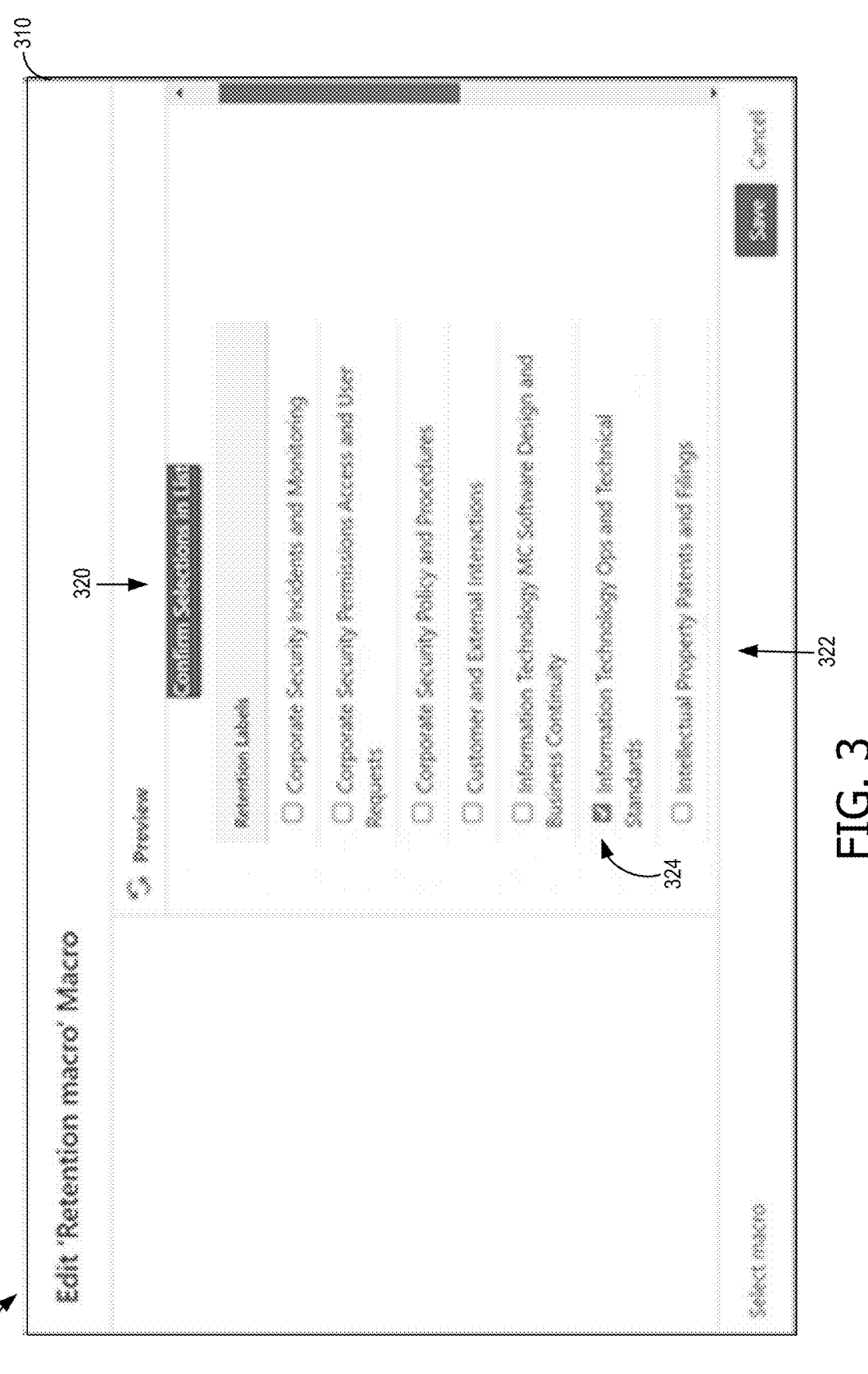
FIG. 3 is an exemplary screenshot of a user interface (UI) that presents a selection list to users.

FIG. 3 is an exemplary screenshot 310 of a user interface (UI) 300 that presents a selection list 320 to users 102. In this example, the user 102 is managing a content item 120 of the content DB 112 (e.g., a Page 116) within the user front end 210 and initiates editing of the retention labels 134 for that content item 120. In response, the retention plugin 106 (e.g., executing on the user computing device 104) communicates with the RMS 130 to generate the selection list 320. More specifically, the selection list 320 is a list of retention labels 134 retrieved from the retention schedule 132. In this example, this selection list 320 displays a title 322 for each retention label 134 in the retention schedule 132 (e.g., where the title represents a written description of the retention label 134) as well as a toggling selection button 324 next to each title 322. As such, each row in the list selection list 320 represents one of the retention labels 134 of the retention schedule 132. While the selection list 320 does not display the retention label 134 for each row, the retention plugin 106 stores the retention label 134 for each row and may use that retention label 134 when saving the selections.

In some examples, the UI 300 allows the user 102 to select multiple retention labels 134 from the list 320. In other examples, the UI 300 allows the user to select one retention label 134. Upon user input to save the selection(s), the retention plugin 106 transmits a label assignment message to the RMS 130 that includes an ID for the content item 120 currently being edited (e.g., a page ID for the Page 116) and the retention label(s) 134 for all of the selections made by the user 102. Upon receipt, the RMS 130 saves the assignment of the selected retention labels 134 for that content item 120 (e.g., as retention metadata 126 associated with the Page 116).

Figure 4:
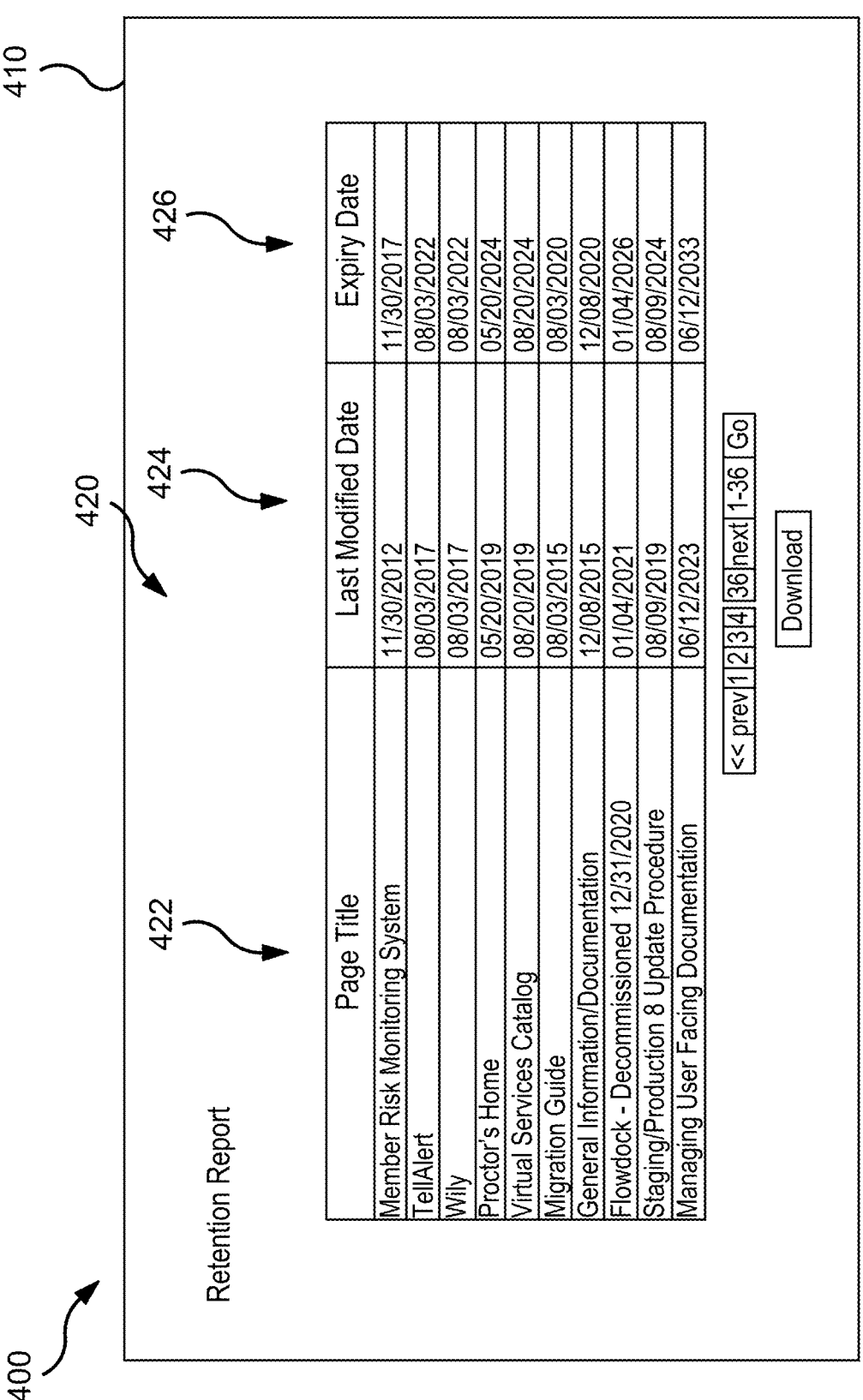
FIG. 4 is an exemplary screenshot of a UI that presents a retention report to users.

FIG. 4 is an exemplary screenshot 410 of a user interface (UI) 400 that presents a retention report 420 to users 102. In this example, the retention report 420 represents a list of all content items 120 (e.g., Pages 116) that are assigned to or otherwise associated with a particular user 102. For example, each row in the retention report 420 represents a Page 116 created by the current user 102. Each row in the retention report includes a page title 422 (e.g., a descriptive title for the Page 116, perhaps from the page metadata 124 for that Page 116), a last modified date 424, and an expiration date (or "expiry date") 426.

Upon entering this screen, the retention plugin 106 communicates with the RMS 130 to generate and display the retention report 420. More specifically, the RMS 130 communicates with the CMS 110 to identify all of the Pages 116 assigned to the user 102. For each assigned Page 116, the RMS 130 retrieves (e.g., indirectly from the CMS 110 or directly from the content DB 112, shown in FIG. 1) the page title 422 and last modified date 424 from the page metadata 124 for that Page 116. Further, the RMS 130 also identifies any and all retention labels 134 assigned to that Page 116 (e.g., from the retention metadata 126 shown in FIG. 1). Using the identified retention label(s) 134, and in conjunction with the retention schedule 132 (shown in FIG. 1), the RMS calculates the expiration date 426 for that Page 116. For time-based retention labels, the expiration date 426 may be a length of time past the last modified date 424, or a creation date for the Page 116, as examples. In cases where multiple retention labels 134 are assigned to a particular Page 116, the strictest (e.g., latest) expiration date may be used. For event-based retention labels, the expiration date 426 may display data about the trigger 139 for that Page 116, whether the trigger condition has occurred, or the like.

In this example, the page title 422 of each row is a user-selectable link that, upon activation by the user 102, redirects the user front end 210 to display the contents of that particular Page 116 (e.g., via the CMS 110). From there, the user 102 may view or edit the page content 122 of that Page 116, edit the retention labels for that Page 116 (e.g., as shown in FIG. 3), or the like.

FIG. 5 is an exemplary screenshot 510 of a user interface (UI) 500 that allows admins 152 to add, edit, or delete retention labels 134 from the retention schedule 132. In this example, the UI 500 includes a label addition pane 520 that allows admins 152 to add new retention labels 134 and an existing labels list 530 that allows admins 152 to view and edit existing retention labels 134.

In the example, the label addition pane 520 includes a category ID field 522, a category description field 524, and a retention period field 526, each of which takes input from the admin 152, as well as an "add entry" button 528 used to save a new retention label 134 to the retention schedule 132. The category ID field 522 is the retention label 134 to be used for the new retention label (e.g., a unique ID across all of the existing retention labels 134 in the retention schedule 132). The category description field 524 is the title of the new retention label 134 (e.g., a readable description of this new label 134). The retention period field 526 is the duration 138 of the new retention label 134 (e.g., presuming a time-based retention type for the new label 134). When adding a new retention label 134, the admin 152 adds a new retention label 134 to the category ID field 522, a title to the category description field 524, and selects a number of years from a drop-down list in the retention period field 526.

Once each field is populated as desired, the admin 152 activates the "add entry" button 528, causing the retention plugin 106 to transmit a label addition request message to the RMS 130 that includes the new retention label 134, the new title, and the number of years. Upon receipt, the RMS 130 adds a new entry into the retention schedule 132 using the received data. In some examples, the RMS 130 may first compare the new retention label 134 to all existing retention labels 134 already existing in the retention schedule 132 and may reject the request if an existing retention label 134 is already using that identifier. Upon successful completion, the retention schedule 132 has accordingly been updated with the new retention label 134, and thus that new retention label 134 may subsequently be assignable to content items 120.

The existing labels list 530, in this example, displays a list of all existing retention labels 134 currently defined in the retention schedule 132. The list 530 includes a category ID column 532 (e.g., showing the ID for the retention label 134), a category description column 534 (e.g., showing the title of the retention label 134), a retention period column 536 (e.g., the duration 138 of the retention label 134), and edit/delete buttons 538 (e.g., allowing the admin 152 to change settings for that retention label 134 or delete the retention label 134 from the retention schedule 132). When creating the list 530, the retention plugin 106 requests the associated data for each of the existing retention labels 134 from the RMS 130 via a retention labels request message. In response, the RMS 130 looks up the data for all of the existing retention labels 134 defined in the retention schedule 132 and sends a response message with that data back to the retention plugin 106 (e.g., to the admin computing device 154).

Figure 6:
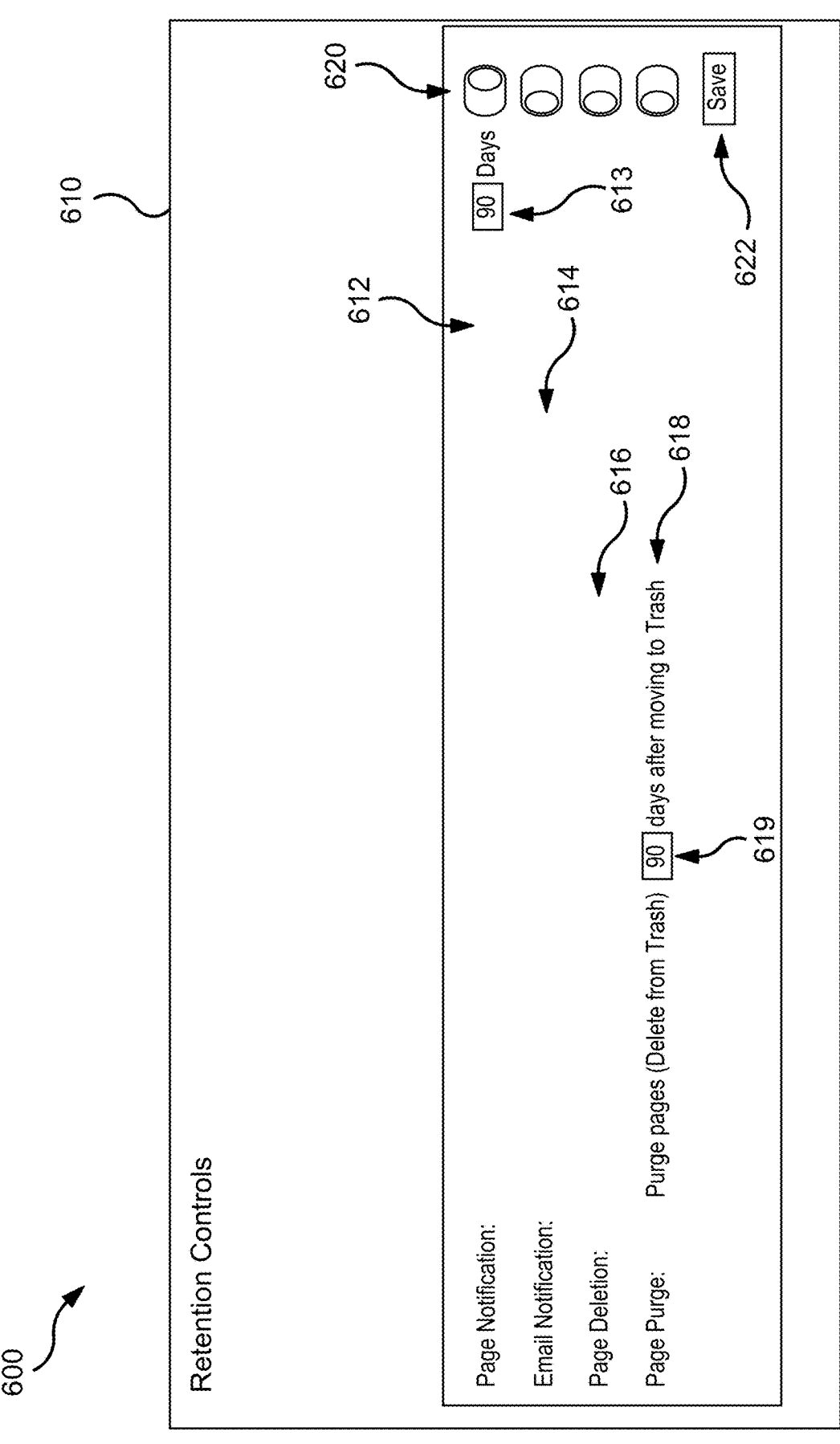
FIG. 6 is an exemplary screenshot of a UI that allows admins to edit retention controls associated with the retention schedule.

FIG. 6 is an exemplary screenshot 610 of a user interface (UI) 600 that allows admins 152 to edit retention controls associated with the retention schedule 132. In this example, the UI 600 provides several example settings that may be configured by the admin 152, including a page notification setting 612, an email notification setting 614, a page deletion setting 616, and a page purge setting 618. Each of these settings 612-618 include a toggle button 620 that is used by the admin 152 to turn on or off the associated setting.

In the example, the page notification setting 612 controls a bell icon notification (e.g., an example alert 142) for pages that are scheduled to expire within a predetermined time frame (e.g., within 90 days). This setting 612 also includes an input field 613 that allows the admin 152 to specify the predetermined time frame. The email notification setting 614 controls whether emails are sent to page owners when pages are about to expire (e.g., on some predefined schedule, such as at the 90-day mark, the 60-day mark, the 30-day mark, then weekly during the last 30 days). The page deletion setting 616 controls whether Pages 116 are moved to 'trash' after expiration of the retention duration. The page purge setting 618 controls whether pages marked as 'trash' are purged (e.g., permanently deleted) from the content DB 112 after expiration, as well as how long after expiration (e.g., admin configurable via an input 619).

Each of the toggles 620 for each of these settings 612-618 may be activated or deactivated by the admin 152 via the UI 600. Upon activating a save button 622, the retention plugin 106 transmits a settings update message to the RMS 130 with the values of each of the settings 612-618. Upon receipt, the RMS 130 updates these settings and begins performing document retention based on these updated settings.

FIG. 7 is an exemplary screenshot 710 of a user interface (UI) 700 that allows users 102 or admins 152 to view a summary report 720 that shows how many content items 120 are assigned to particular retention labels 134. In this example, the summary report 720 includes a category ID column 722 (e.g., showing unique retention labels 134 in the retention schedule 132), a category description column 724 (e.g., showing the title for that particular retention label 134), a retention period column 726 (e.g., showing duration 138 of that retention label 134), and a count column 728 (e.g., showing a total number of content items, such as Pages 116 and Spaces 114, that are currently assigned that retention label 134). As such, each row in the summary report 720 represents one of the unique retention labels 134 of the retention schedule 132.

The RMS 130 generates the summary report 720 by traversing through the retention schedule 132. For each unique retention label 134 in the retention schedule 132, the RMS 130 displays the retention label 134 in the category ID column 722, the title of the retention label 134 in the category description column 724 of that row, and the duration 138 of that retention label 134 in the retention period column 726. Further, the RMS 130 identifies a number of content items 120 from within the content DB 112 that are assigned that particular retention label 134. In some examples, the RMS 130 may scan through all of the content items 120 in the content DB 112, inspecting the retention metadata 126 of each content item 120 to determine whether or not that current retention label 134 is assigned to the content item 120. The RMS 130 thus counts all of the content items 120 that are assigned to that retention label 134 to generate a total. In other examples, the RMS 130 may maintain an ongoing total for each unique retention label 134. For example, as content items 120 are assigned a particular retention labels 134, the RMS 130 increments a counter associated with that retention label 134. When content items 120 that are assigned that retention label 134 are deleted or have that retention label 134 removed, the RMS 130 decrements the counter. As such, the RMS 130 maintains a running total of content items 120 that are assigned to each particular retention label 134. However gathered, this count is displayed in the count column 728 for that retention label 134.

In some examples, the UI 700 may provide a user-selectable link (e.g., via the category ID column 722) that, upon selection, causes the RMS 130 to display a detailed report (not shown) that shows each of the content items 120 assigned to that particular retention label 134. The detailed report can show additional details about each of the content items 120 assigned to that retention label 134, such as a space ID, a space name, a page ID, a page title, a last modified date, owner information for the content item 120, or the like. This detailed report may be similar to the detailed expiring report described below in reference to FIG. 9.

Figure 8:
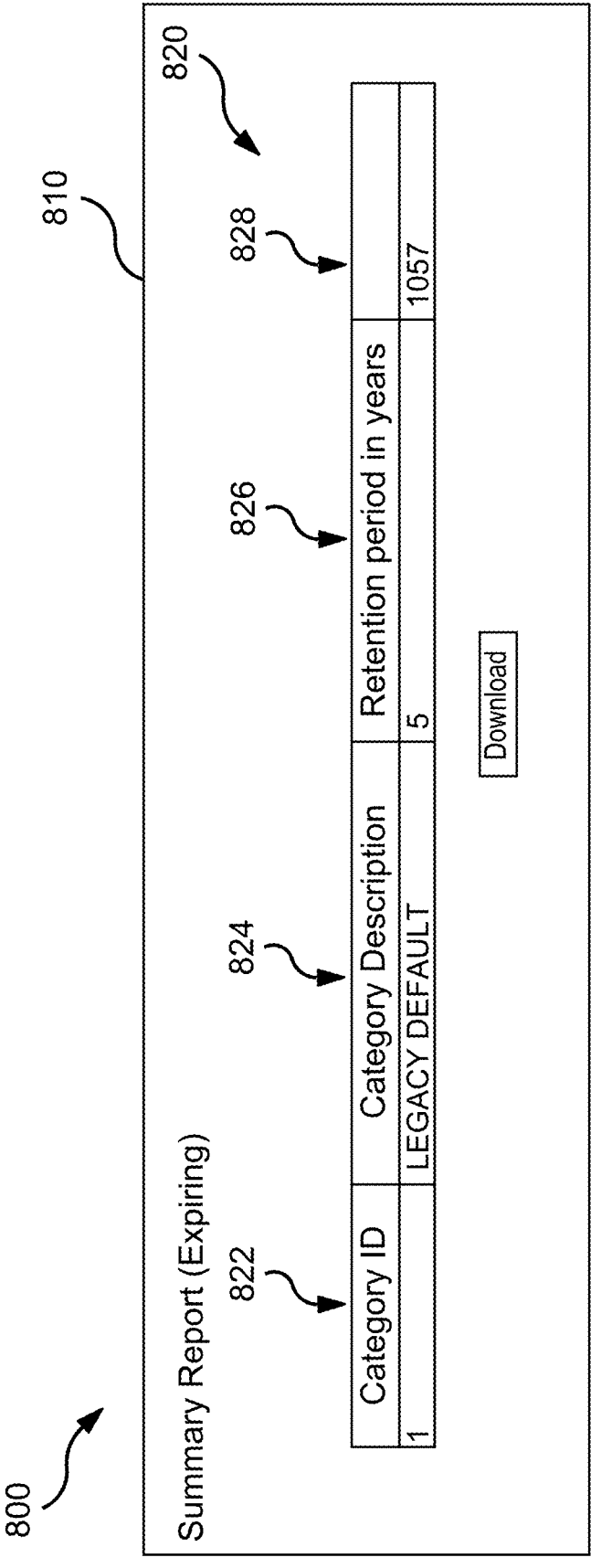
FIG. 8 is an exemplary screenshot of a UI that allows users or admins to view an expiration report.

FIG. 8 is an exemplary screenshot 810 of a user interface (UI) 800 that allows users 102 or admins 152 to view an expiration report 820. In this example, the expiration report 820 summarizes, by category ID (e.g., by retention label 134), how many content items 120 (e.g., Pages 116, Spaces 114) that are set to expire within a predetermined expiration window (e.g., expiring within the next 90 days). The expiration report 820 includes a category ID column 822 (e.g., showing unique retention labels 134 in the retention schedule 132), a category description column 824 (e.g., showing the title for that particular retention label 134), a retention period column 826 (e.g., showing duration 138 of that retention label 134), and a count column 828 (e.g., showing a total number of content items, such as Pages 116 and Spaces 114, that are currently set to expire within the expiration window. As such, each row in the expiration report 820 represents one of the unique retention labels 134 of the retention schedule 132 that has at least one content item 120 that is going to expire within the expiration window.

The RMS 130 generates the expiration report 820 by traversing through the retention schedule 132. For each unique retention label 134 in the retention schedule 132, the RMS 130 generates an expiration count that identifies how many of the content items 120 in the content DB 112 that are assigned to this particular retention label 134 and that are set to expire within the expiration window (e.g., have an expiration date within the next 90 days, based on the duration 138 for that retention label 134 and the creation date or last modified date of the content item 120). The RMS 130 thus sums up, as an "expiration count," the total number of those content items 120 for each unique retention label 134 in the retention schedule 132. In the example, the RMS 130 displays a row in the expiration report 820 for each unique retention label 134 that has an expiration count greater than zero (e.g., has at least one content item 120 expiring within the next 90 days). For each row, the RMS 130 displays the retention label 134 in the category ID column 822, the title of the retention label 134 in the category description column 824 of that row, the duration 138 of that retention label 134 in the retention period column 826, and the expiration count in the count column 828.

In the example, the UI 800 provides a user-selectable link (e.g., via the category ID column 822) that, upon selection, causes the RMS 130 to display a detailed expiring report that shows each of the content items 120 assigned to that particular retention label 134 that are expiring within the expiration window, as described below with respect to FIG. 9.

Figure 9:
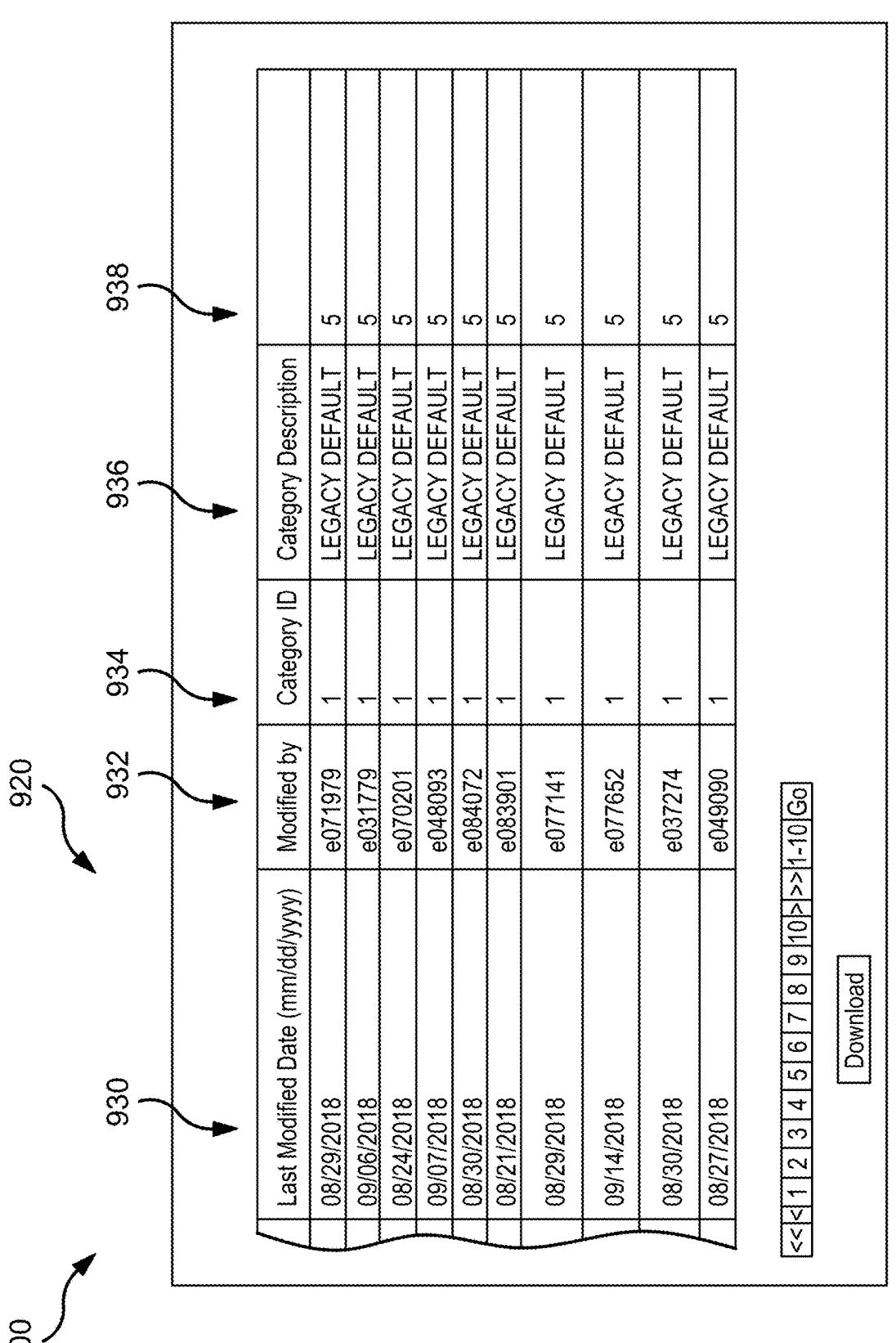
FIG. 9 is an exemplary screenshot of a UI that allows users or admins to view a detailed expiration report.

FIG. 9 is an exemplary screenshot 910 of a user interface (UI) 900 that allows users 102 or admins 152 to view a detailed expiration report 920. In this example, the detailed expiration report 920 is displayed after a user 102 selects one of the particular rows (e.g., retention labels 134) in the expiration report 820 shown in FIG. 8.

The example detailed expiration report 920 includes a row for each content item 120 that is assigned to the particular retention label 134 (e.g., each Page 116 or Space 114 that has been assigned to this retention label 134) and that is expiring within the expiration window, as described above. Each row of the report 920 shows various details (e.g., components of page metadata 126 or retention metadata 128) for that particular content item 120. More specifically, the detailed expiration report 920 includes a space ID column 922 (e.g., showing a unique identifier for a Space 114 to which the content item 120 is assigned), a space name column 924 (e.g., showing a title or name for that Space 114), a page ID column 926 (e.g., showing a unique identifier for this content item 120), a page title column 928 (e.g., showing a title or name for that content item 120), a last modified date column 930 (e.g., showing a date when the content item 120 was last modified), a last modifier column 932 (e.g., showing a user ID of the user 102 that last modified the content item 120), a category ID column 934, a category description column 936, and a retention period column 938 (e.g., showing the retention label 134 as well as the title and the duration of the retention label 134, respectively).

Like the counting process described above with respect to FIG. 8, during creation of the detailed expiration report 920, the RMS 130 similarly identifies each of the content items 120 from the content DB 112 that are both assigned to the selected retention label 134 and that are expiring within the expiration window. In other words, the detailed expiration report 920 should have a number of rows equal to the count generated in FIG. 8. The RMS 130 uses data from the content item 120 (e.g., from page content 122, page metadata 124) to populate columns 926-932, data from the retention schedule 132 to populate columns 934-938, and data or metadata from the associated Space 114 (not separately shown) to populate columns 922-924.

Figure 10:
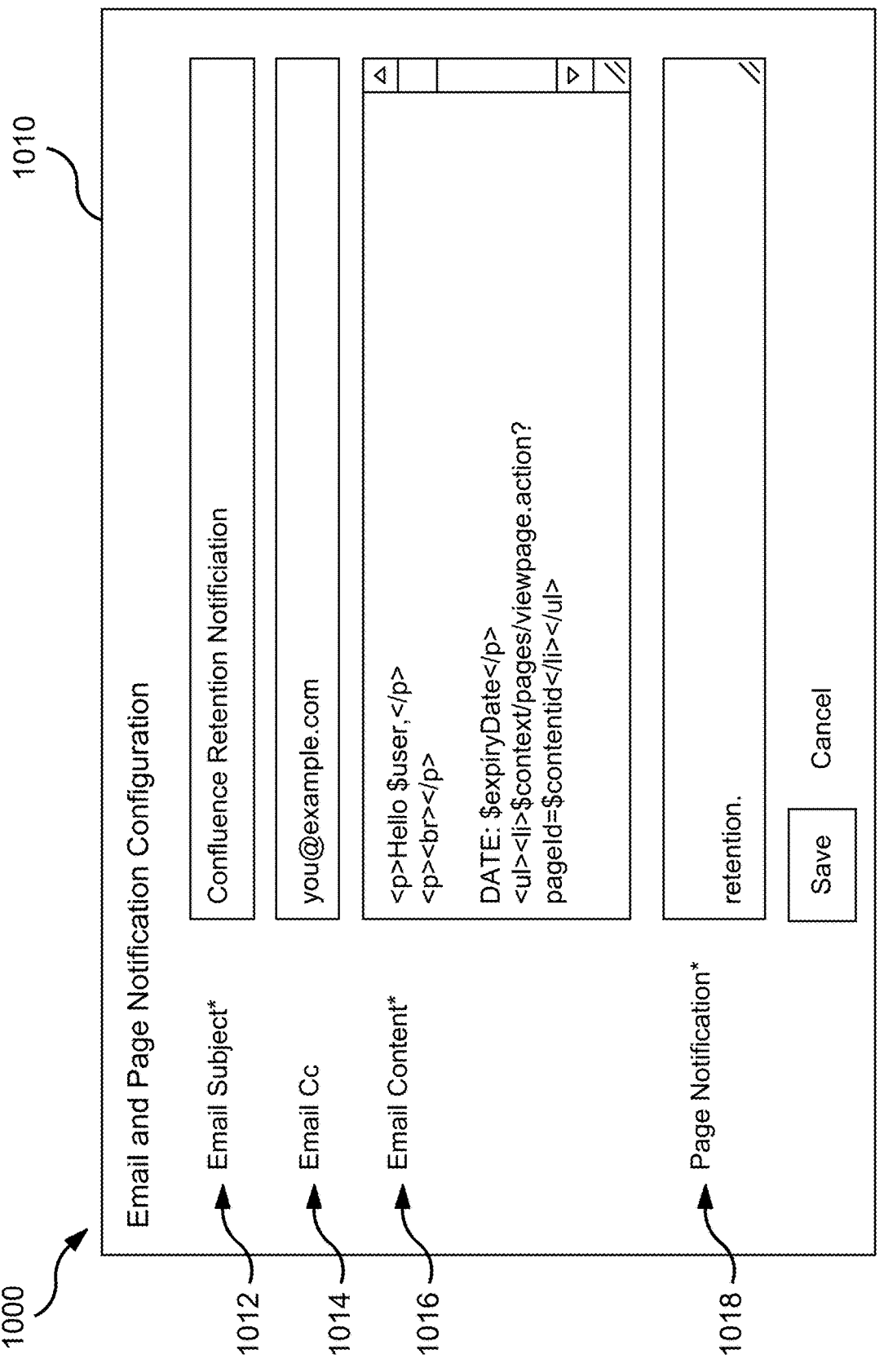
FIG. 10 is an exemplary screenshot of a UI that allows admins to configure an alert to notify users when a content item is nearing its expiration date.

FIG. 10 is an exemplary screenshot 1010 of a user interface (UI) 1000 that allows admins 152 to configure an alert 142 to notify users 102 when a content item 120 is nearing its expiration date. In this example, the alert 142 being configured includes both an email-type alert 142 that is configured to generate an email message to a particular user 102 (e.g., the owner of a particular Page 116, or the like) and a page notification alert 142 (e.g., shown to the owner or other users 102 of the content item 120). These alerts 142 are activated by the RMS 130 when a particular content item 120 is within a predetermined time of expiring, being marked as 'trash,' or being permanently deleted.

When configuring this example email notification, the admin 152 enters an email subject 1012 (e.g., what will be used as the "subject" line of the email), an optional email carbon copy (CC) address 1014 (one or more extra email addresses to CC on the email), email content 1016 (e.g., what will appear in the body of the email, in plain text, markup language, or the like), and page notification 1018 (e.g., text that will be presented to users 102 via the user front end 210 when the particular content item 120 is viewed or edited).

During operation, the RMS 130 monitors expiration dates of content items 120 and activates alerting functionality on certain preconfigured conditions (e.g., based on the settings configured on the RMS 130). In this example, when content items 120 are within an expiration window (e.g., within 90 days, 60 days, 30 days, or the like), this example alert 142 shown in FIG. 10 causes the RMS 130 to send an email to the owner of the expiring content item 120 (e.g., with a subject line of "Confluence Retention Notification" and with particular details in the body of the email), as well as generate a page notification whenever the owner or any other user 102 views the expiring content item 120 (e.g., displaying a popup notification, or the like, including "Retention Alert: The following page will be deleted due to retention.").

FIG. 11 to FIG. 16 illustrate example screenshots of the retention calculator 108 shown in FIG. 1. In these examples, the screenshots are displayed to the user 102 (e.g., on the user computing device 104) via the user front end 210 (shown in FIG. 2) by the RMS 130, and perhaps in conjunction with the retention plugin 106. The user 102 may be editing a particular content item 120 (e.g., a Page 116) and may be prompted to add a retention label 134 to that content item 120. As such, the interface to the CMS 110 may present means for activating the retention calculator 108 (e.g., via a button or menu option). The below example presumes that the user 102 has activated the retention calculator 108 for a particular content item 120 (e.g., for the current Page 116 being viewed by the user 102), and thus the user 102 answers questions specific to the nature of that particular content item 120. Based on the user inputs received via the retention calculator 108 in these example screenshots, the RMS 130 identifies suggested retention label(s) 134 that can then be applied to that particular content item 120.

Figure 11:
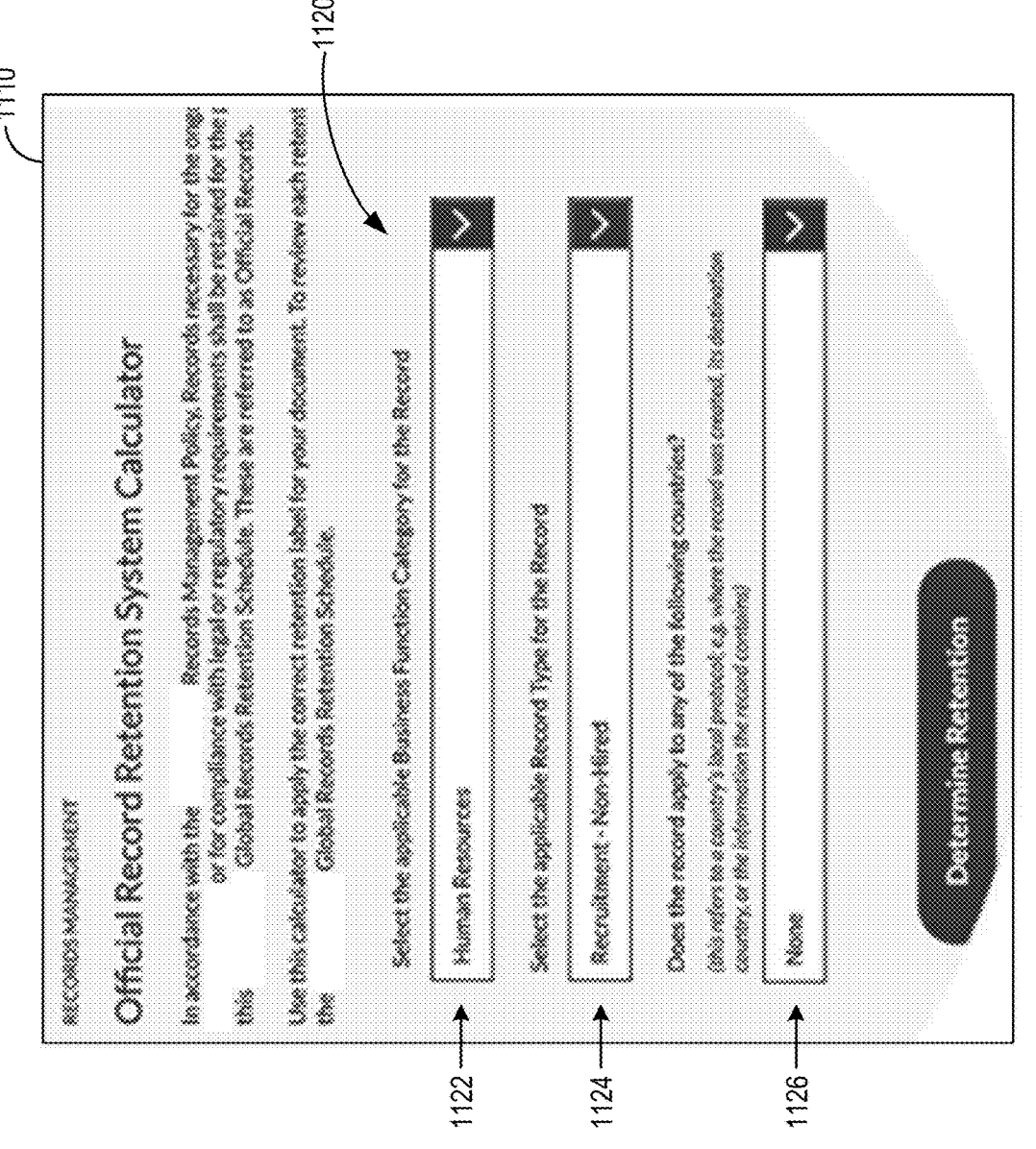
FIG. 11 is an exemplary screenshot of a UI that is initially presented to the user when activating the retention calculator shown in FIG. 1.

FIG. 11 is an exemplary screenshot 1110 of a user interface (UI) 1100 that is initially presented to the user 102 when activating the retention calculator 108 shown in FIG. 1. In this example, the retention calculator 108 displays a selection interface 1120 that includes several dropdown lists that prompt the user 102 for answers to a series of queries. The selection interface 1120 includes a business function category list 1122, a record type list 1124, and a region selection list 1126. The user 102 starts out by selecting a business function for the current content item 120 by activating the business function dropdown list 1122.

Figure 12:
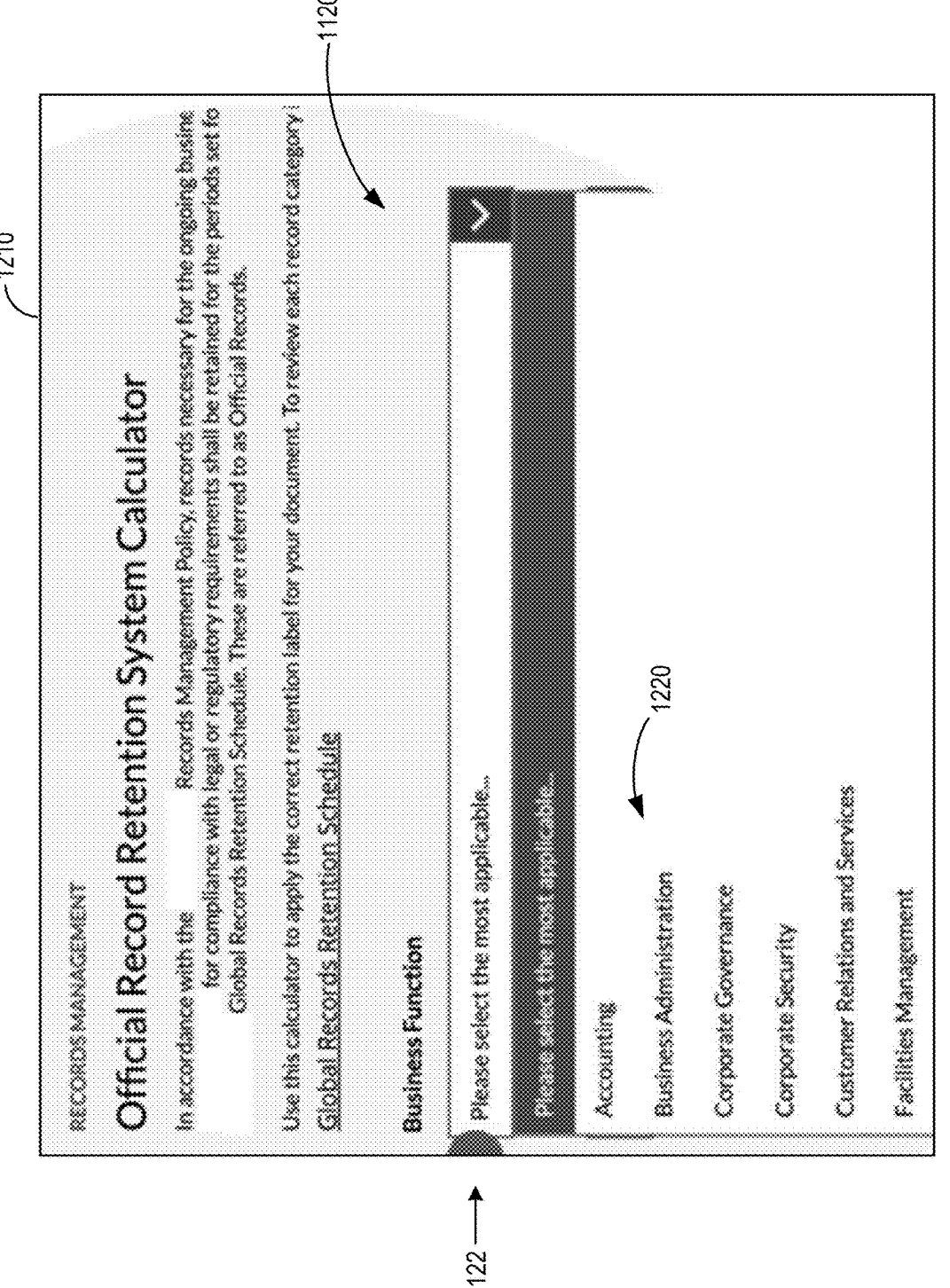
FIG. 12 illustrates a screenshot of the business function dropdown list shown in an expanded list form.

FIG. 12 illustrates a screenshot 1210 of the business function dropdown list 1122 shown in an expanded list 1220 form. The expanded list 1220 displays a set of preconfigured business functions that may apply to various content items 120 within the content DB 112, such as "Accounting," "Business Administration," "Corporate Governance," "Corporate Security," "Customer Relations and Services," "Facilities Management," and so forth. The business functions of the expanded list 1220 are preconfigured on the RMS 130 or the CMS 110 and are retrieved (e.g., via a business functions request message and response to the RMS 130 or CMS 110) and populated into this list 1220 when the retention calculator 108 is initially activated. The user 102 scrolls through this list 1220 and selects the most applicable business function for the current content item 120.

Figure 13:
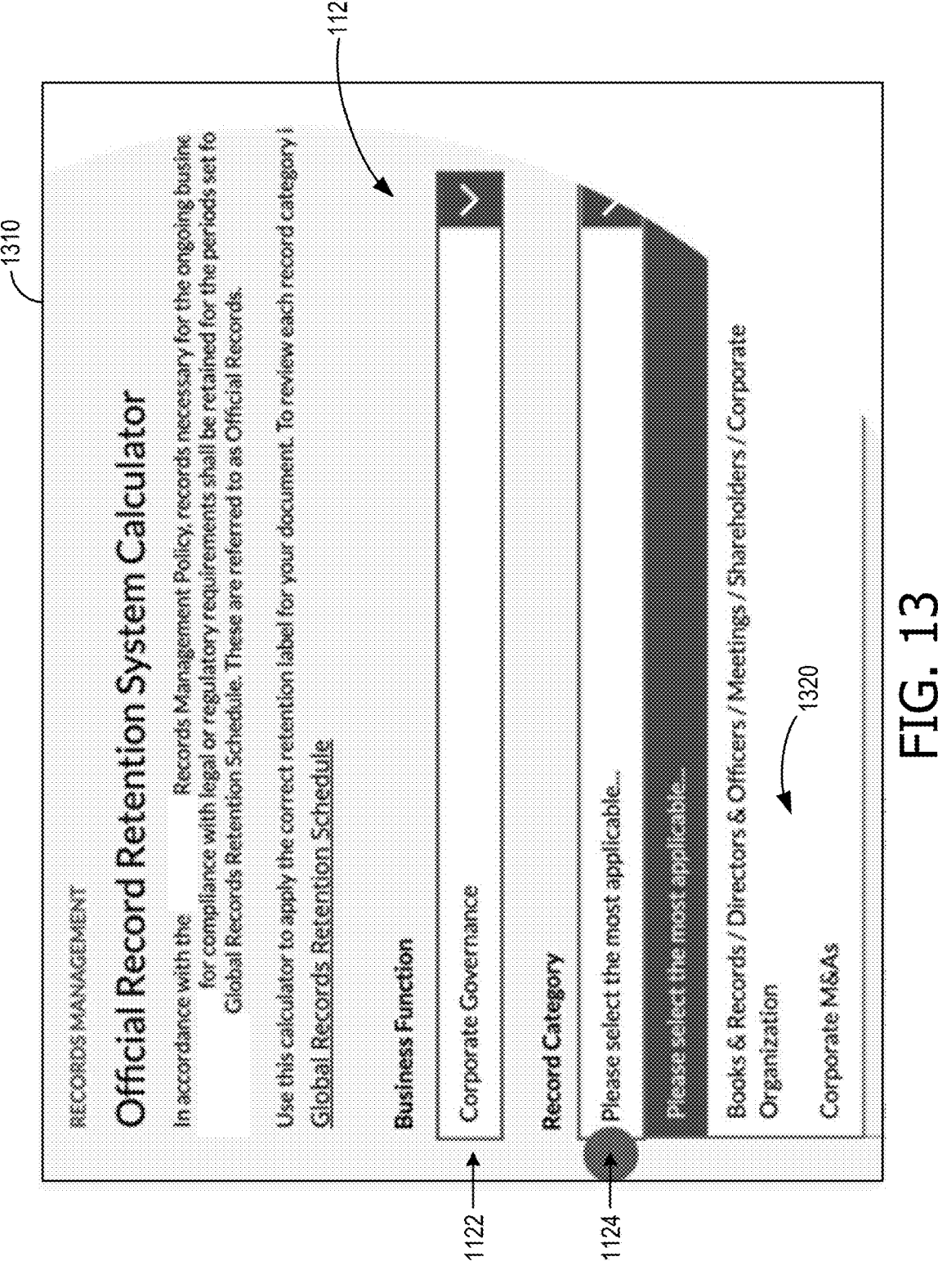
FIG. 13 illustrates a screenshot of the record category dropdown list in an expanded list form.

FIG. 13 illustrates a screenshot 1310 of the record category dropdown list 1124 in an expanded list 1320 form. Upon selection of a business function from the business function dropdown list 1122, as shown above in FIG. 12, the retention calculator 108 retrieves a set of record categories to show in the expanded list 1320 for the record category. In these examples, each particular business function of the business function list 1122 has a preconfigured set of one or more record categories that are associated with that particular business function. As such, the expanded list 1320 is auto-populated by the retention calculator 108 after a particular business function is selected. More specifically, upon selection of the business function, the retention calculator 108 sends a record category request message to the CMS 110 or the RMS 130 identifying the selected business category (e.g., by business category name, unique ID, or the like). In response, the CMS 110 or RMS 130 looks up the set of record categories associated with that selected business category and transmits a record category response message to the retention calculator 108 with those record categories. The retention calculator 108 populates the received record categories into the expanded list 1320 and, upon activation of the dropdown list 1124, displays the expanded list 1320 to the user 102 and allows the user 102 to select one of the record categories.

Figure 14:
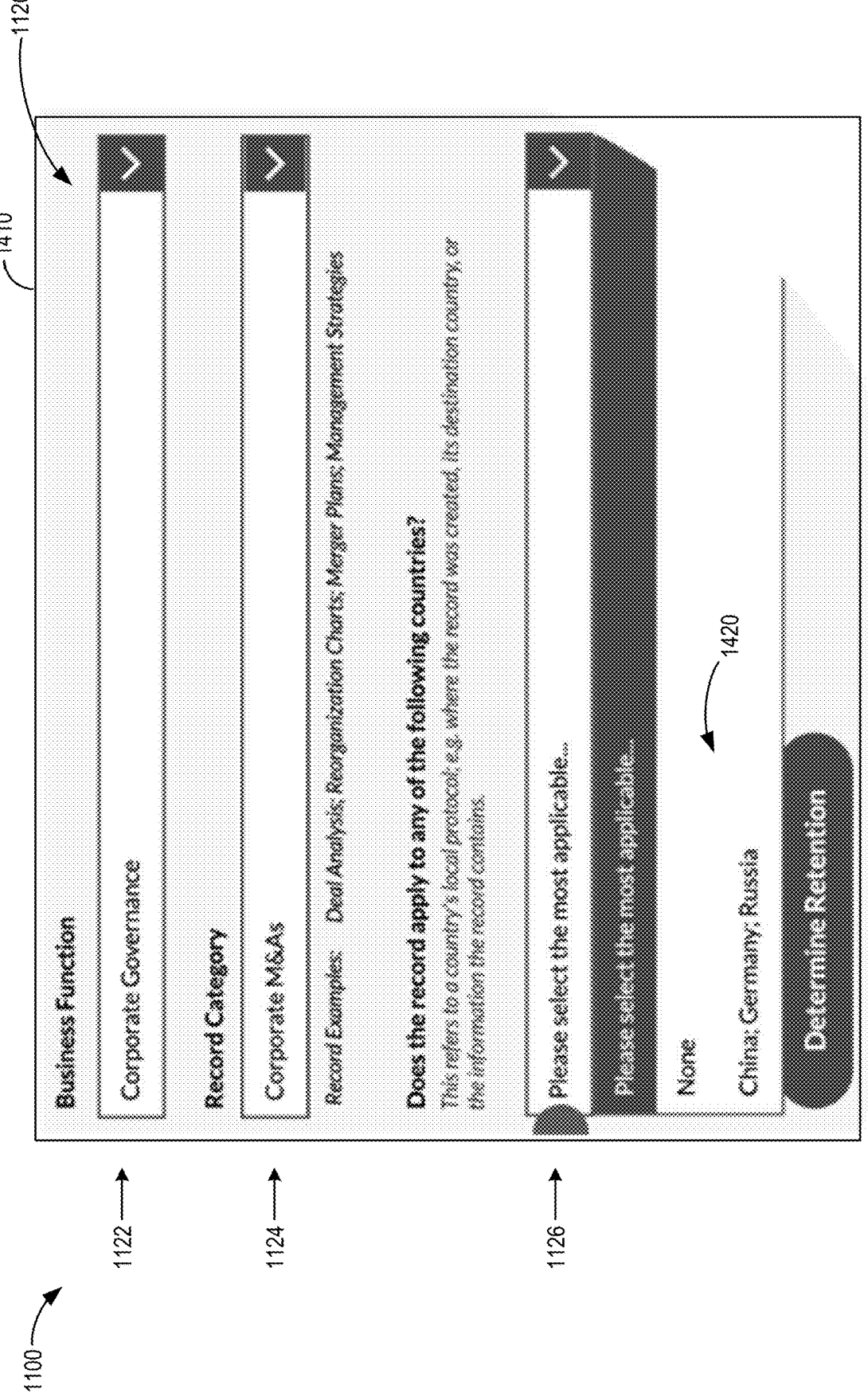
FIG. 14 illustrates a screenshot of the region selection list in an expanded list form.

FIG. 14 illustrates a screenshot 1410 of the region selection list 1126 in an expanded list 1420 form. Some regions (e.g., geographic regions, legal jurisdictions, political regions such as countries, states, provinces, counties, cities, municipalities, or the like) may have specific retention requirements for certain types of documents. As such, the retention calculator 108 provides the region selection list 1126 to allow the user 102 to identify what particular region(s) may be applicable to this content item 120. More specifically, upon activation, the region selection list 1126 displays the expanded list 1420 of regions from which the user 102 may select one or more. In the example, some regions may be automatically added into the region selection list 1420 (e.g., a default option such as "None").

In some examples, some regions are dynamically added into the region selection list 1420 based on one or more of the selected business function or the selected record category. For example, a particular country or jurisdiction may have specific retention requirements for "Corporate Governance" type documents. As such, when "Corporate Governance" is selected as the business function (e.g., in the business function list 1122), the retention calculator 108 may populate a region option such as "China; Germany; Russia" into the region selection list 1126. In this example, the region selection list 1420 may be automatically populated with a set of default region selections and may be supplemented when either of the business function or the record category are changed in this UI 1100. For example, upon selection of the "Corporate Governance" option via the business function list 1122, the retention calculator transmits a region selection request to the CMS 110 or RMS 130 that identifies the currently-selected business function and/or record category. In response, the CMS 110 or RMS 130 looks up any specific, preconfigured regions that are associated with the business function or record category and sends those additional region selections to the retention calculator 108 in response. The retention calculator 108 thus automatically updates the region selection list 1126 with those new region selection options.

Figure 15:
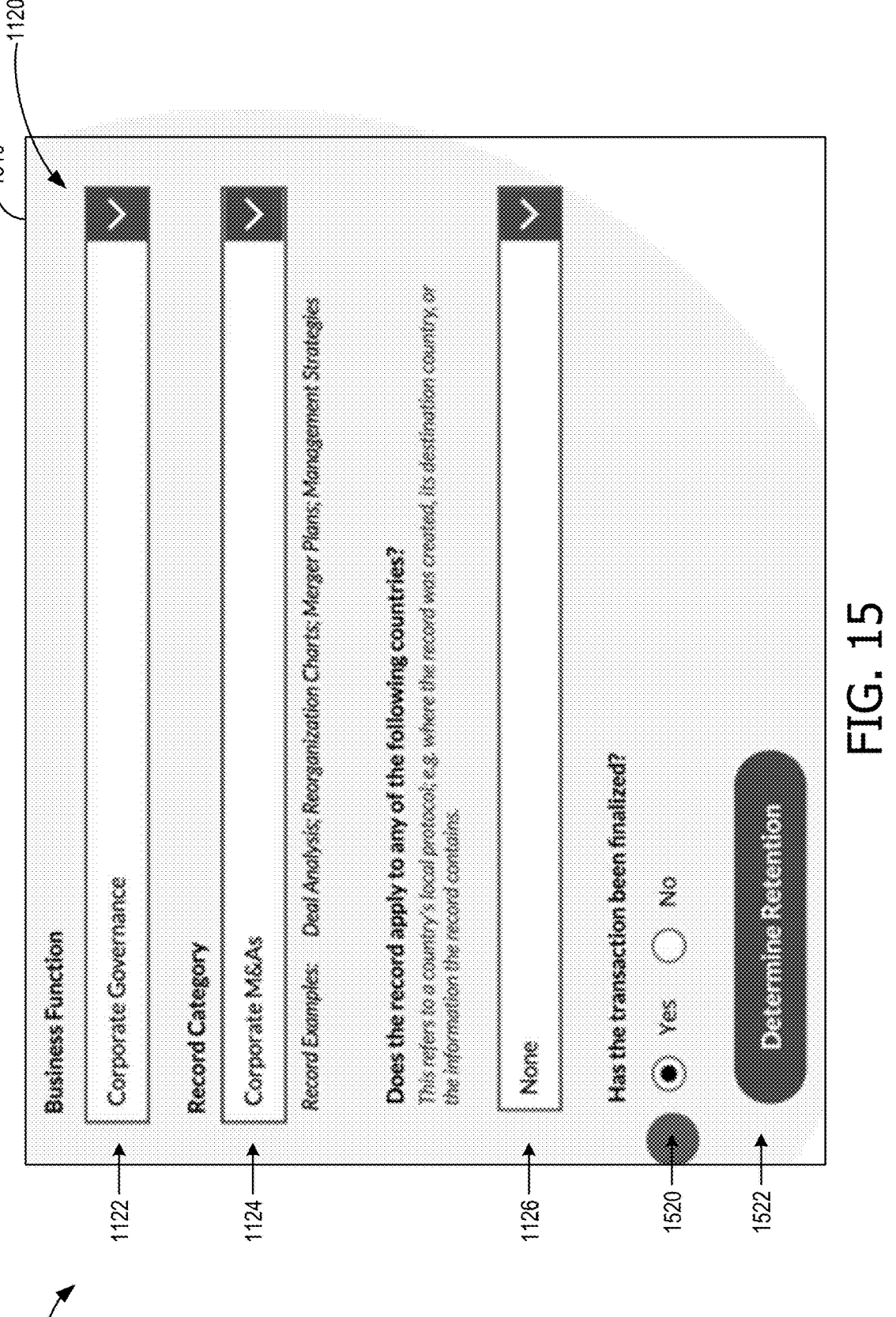
FIG. 15 illustrates a screenshot that allows the user to finalize their selections.

FIG. 15 illustrates a screenshot 1510 that allows the user 102 to finalize their selections. In this example, the user 102 selects a "Yes" option from a finalization toggle 1520 when they have completed selections in each of the lists 1122-1126 and then activates a determine retention button 1522. In some examples, this activation may be rejected if one or more of the selections lists 1122-1126 have not been completed. Upon successful button activation, the retention calculator 108 transmits a retention recommendation request message to the CMS 110 or the RMS 130. The retention recommendation request message includes the selected business function, record category, and region provided by the user 102.

The CMS 110 or RMS 130 includes a retention mapping schedule (not shown) that is used to identify retention categories associated with particular types of business functions, record categories, and regions. This retention mapping schedule is preconfigured logic (e.g., created and edited by the admin 152) that maps particular combinations of selections (e.g., one or more business functions, record categories, regions, or combinations thereof) to one or more retention labels 134. For example, the retention mapping schedule may be configured with a mapping that maps "business function='Business Administration' and record category='Departmental Meetings & Asset Management'" to a retention label 134 of "CMAM_5" (e.g., with a title of "Internal Meetings & Asset Management" and having a retention type 136 of [soft & time-based] and a duration 138 of 5 years). Accordingly, the retention calculator 108 receives one or more suggested retention labels 134 and associated information from the CMS 110 or RMS 130.

Figure 16:
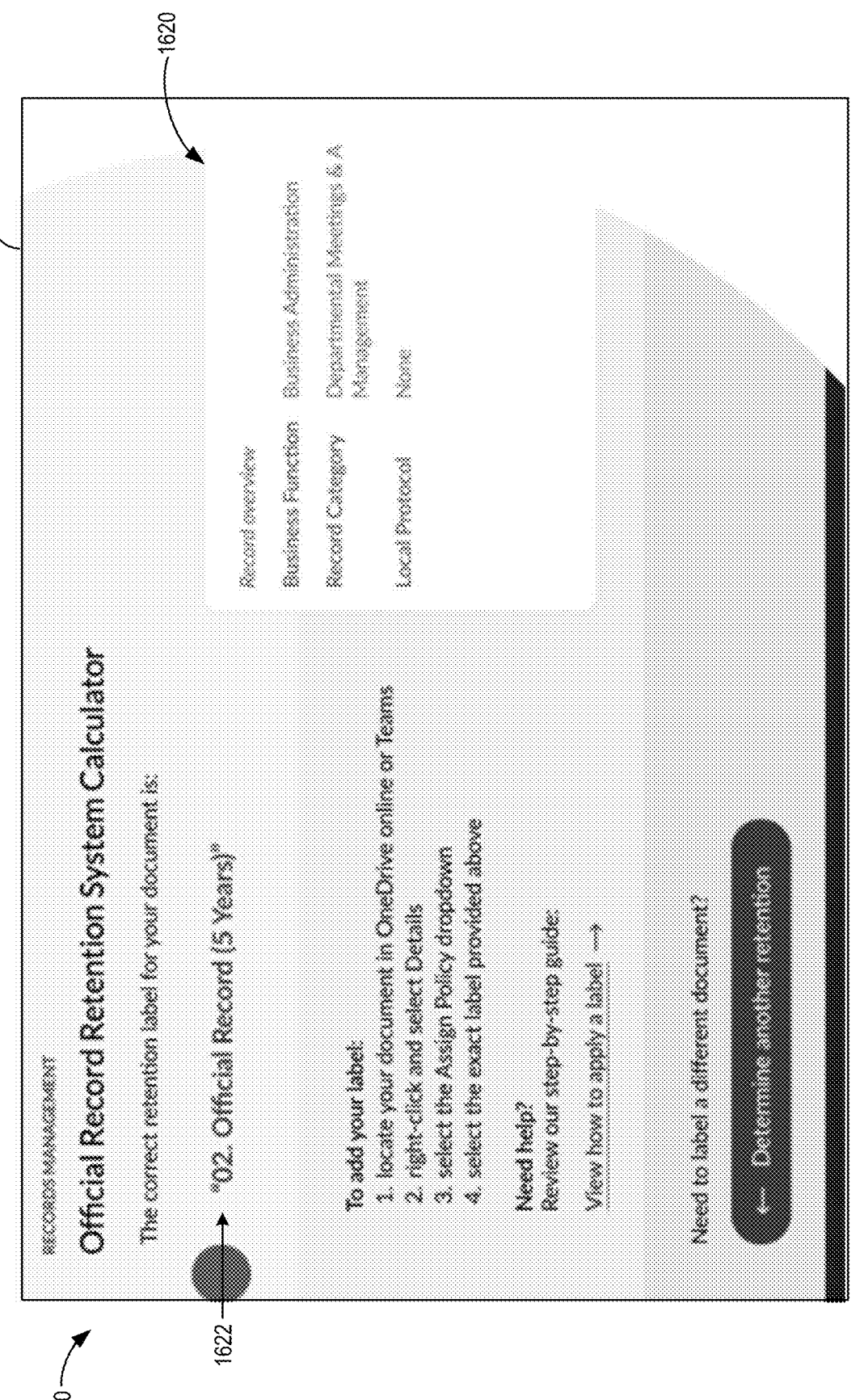
FIG. 16 illustrates a screenshot that presents the results of the retention label suggestions to the user.

FIG. 16 illustrates a screenshot 1610 that presents the results of the retention label suggestions to the user 102. In this example, the UI 1100 displays a selections summary section 1620 that shows the selected business function, record category, and region that were used for this recommendation. The UI 1100 also displays a retention label suggestion 1622 that identifies information about the recommendation. In this example, given the selections identified in the selections summary section 1620, the retention calculator 108 is suggesting a retention label 134 that would identify the content item 120 as an "Official Record" with a retention duration of five years. In some examples, the user 102 returns to view the content item 120 (e.g., closes the retention calculator 108) and adds the suggested retention label 134 to the content item 120 (e.g., via the selection list 320 shown in FIG. 3). In some examples, the retention calculator 108 may provide an "Accept Suggested Retention" button that, upon activation by the user 102, causes the suggested retention label(s) to be added to the content item 120. In other examples, the CMS 110 or RMS 130 may automatically apply the suggested retention label(s) 134 to the content item 120 (e.g., without prompting the user 102).

FIG. 17 is a flowchart of an exemplary method 1700 for adding record retention to content items. In some examples, the method 1700 is performed by the RMS 130 or the CMS 110 shown in FIG. 1. In the example, the RMS 130 identifies a content item 120 stored in a content items database 112 at operation 1710. In some examples, the content item 120 is a Page 116 or a Space 114 shown in FIG. 1. At operation 1712, the RMS 130 causes a user interface (UI) (e.g., the user front end 210) to be displayed on a user device (e.g., the user computing device 104), the UI includes a first list (e.g., the list 1122) for a first categorization criterion (e.g., the business function list 1122), the first categorization criterion including one or more first criterion options selectable via the first list. In some examples, the first categorization criterion is a business function category, and the one or more first criterion options include a plurality of preconfigured business functions. In some examples, the first categorization criterion is a region, and the one or more first criterion options include a plurality of regions, where each region of the plurality of regions identifying one of a geographic region, a jurisdictional region, and a political region.

At operation 1714, the RMS 130 receives first user input (e.g., selection from the business function dropdown list 1122) from the UI indicating a first user selection for the first categorization criterion, the first user selection being one of the one or more first criterion options. At operation 1716, the RMS 130 identifies a retention mapping schedule, the retention mapping schedule maps the one or more first criterion options to retention labels 134 of a retention schedule 132. At operation 1718, the RMS 130 determines a retention label for the content item based on the first user selection and the retention mapping schedule, the retention label being defined in the retention schedule and having an expiration duration (e.g., duration 138) defining how long content items marked with the retention label are retained. At operation 1720, the RMS 130 stores the retention label as metadata (e.g., retention metadata 128) for the content item. At operation 1722, the RMS 130 deletes the content item after an expiration duration of the content item has elapsed.

In some examples, the UI further includes a second list (e.g., expanded list 1320) for a second categorization criterion (e.g., record category list 1124), the second categorization criterion including one or more second criterion options selectable via the second list, wherein the retention mapping schedule further maps the one or more second criterion options to retention labels of the retention schedule. In some examples, determining a retention label for the content item is further based on a second user selection for the second categorization criterion, the second user selection being one of the one or more second criterion options. In some examples, the first categorization criterion is a business function category, the one or more first criterion options include a plurality of preconfigured business functions, wherein the second categorization criterion is a record type, and the one or more second criterion options include a plurality of preconfigured record types associated with a particular business function of the preconfigured business functions. In some examples, the UI automatically populates the one or more second criterion options in the second list upon receipt of the first user selection, and the one or more second criterion options are identified based on the first user selection.

Exemplary Operating Environment

Figure 18:
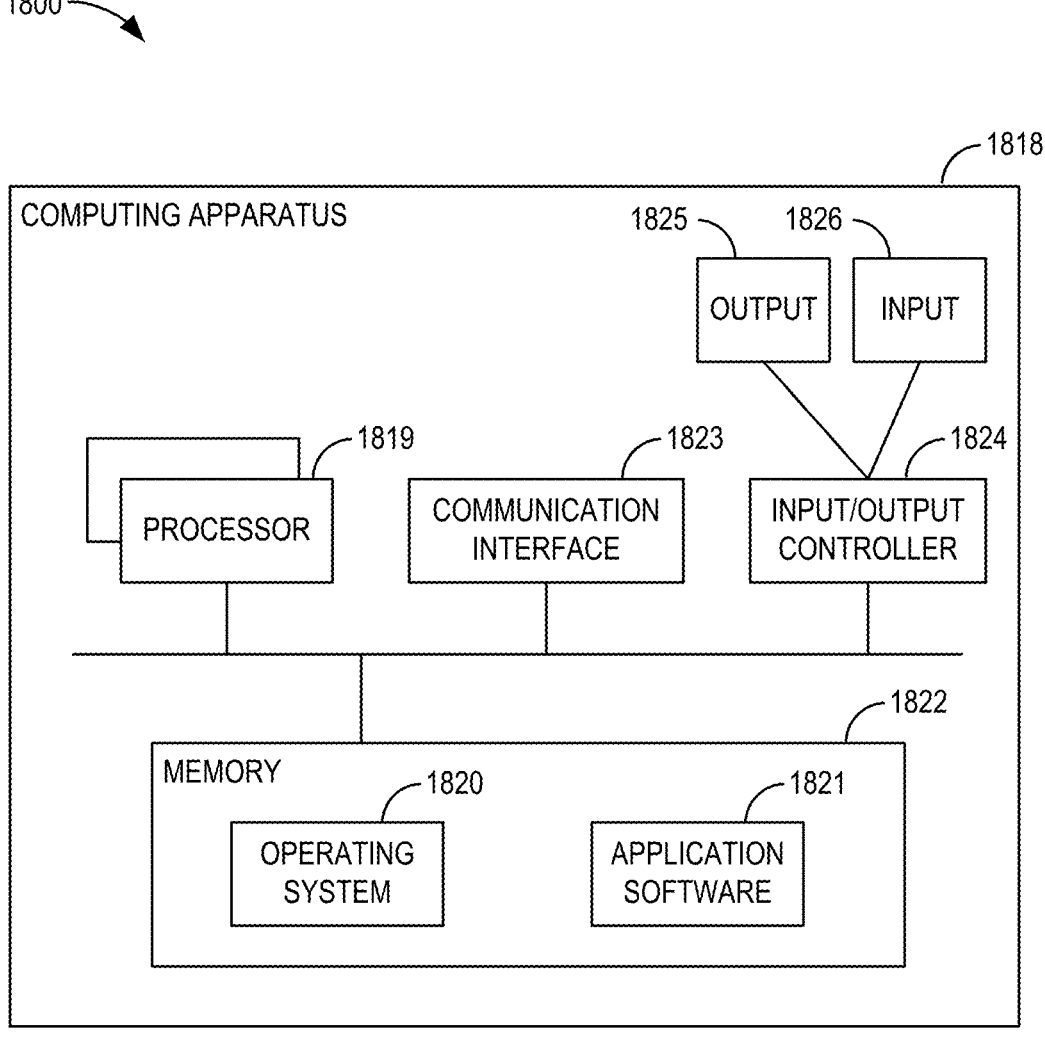
FIG. 18 is a functional block diagram of a computing apparatus according to an embodiment.

The present disclosure is operable with a computing apparatus according to an embodiment as a functional block diagram 1800 in FIG. 18. In an example, components of a computing apparatus 1818 are implemented as a part of an electronic device according to one or more embodiments described in this specification. The computing apparatus 1818 is a computing device, such as, but not limited to, the computing devices 104, 154, the CMS 110, the RMS 130, the content DB 112, or the retention metadata DB 131 in FIG. 1.

The computing apparatus 1818 comprises one or more processors 1819 which can be microprocessors, controllers, or any other suitable type of processors for processing computer executable instructions to control the operation of the electronic device. Alternatively, or in addition, the processor 1819 is any technology capable of executing logic or instructions, such as a hardcoded machine. In some examples, platform software comprising an operating system 1820 or any other suitable platform software is provided on the apparatus 1818 to enable application software 1821 to be executed on the device. In some examples, receiving and routing RPC messages from external sources to microservice rails of a microservice platform as described herein is accomplished by software, hardware, and/or firmware.

In some examples, computer executable instructions are provided using any computer-readable medium or media accessible by the computing apparatus 1818. Computer-readable media include, for example, computer storage media such as a memory 1822 and communications media. Computer storage media, such as a memory 1822, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 1822) is shown within the computing apparatus 1818, it will be appreciated by a person skilled in the art, that, in some examples, the storage is distributed or located remotely and accessed via a network or other communication link (e.g., using a communication interface 1823).

Further, in some examples, the computing apparatus 1818 comprises an input/output controller 1824 configured to output information to one or more output devices 1825, for example a display or a speaker, which are separate from or integral to the electronic device. Additionally, or alternatively, the input/output controller 1824 is configured to receive and process an input from one or more input devices 1826, for example, a keyboard, a microphone, or a touchpad. In one example, the output device 1825 also acts as the input device. An example of such a device is a touch sensitive display. The input/output controller 1824 in other examples outputs data to devices other than the output device, e.g., a locally connected printing device. In some examples, a user provides input to the input device(s) 1826 and/or receives output from the output device(s) 1825.

The functionality described herein can be performed, at least in part, by one or more hardware logic components. The computing apparatus 1818 is configured by the program code when executed by the processor 1819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Additional Examples

In some examples, a content management system for adding record retention to content items is provided. The content management system includes a content items database storing content items, at least one processor, and at least one memory including computer-readable instructions. The at least one processor, the at least one memory and the computer-readable instructions are configured to cause the at least one processor to: identify a content item stored in the content items database, the content item including content data and content metadata; cause a user interface (UI) to be displayed on a user device, the UI includes a first list for a first categorization criterion, the first categorization criterion including one or more first criterion options selectable via the first list; receive first user input from the UI indicating a first user selection for the first categorization criterion, the first user selection being one of the one or more first criterion options; identify a retention mapping schedule, the retention mapping schedule maps the one or more first criterion options to retention labels of a retention schedule; determine a retention label for the content item based on the first user selection and the retention mapping schedule, the retention label being defined in the retention schedule and having an expiration duration defining how long content items marked with the retention label are retained; store the retention label as metadata for the content item; and retain the content item until after an expiration duration of the content item has elapsed.

In some examples, a method for adding record retention to content items is provided. The method includes: identifying a content item stored in a content items database; causing a user interface (UI) to be displayed on a user device, the UI includes a first list for a first categorization criterion, the first categorization criterion including one or more first criterion options selectable via the first list; receiving first user input from the UI indicating a first user selection for the first categorization criterion, the first user selection being one of the one or more first criterion options; identifying a retention mapping schedule, the retention mapping schedule maps the one or more first criterion options to retention labels of a retention schedule; determining a retention label for the content item based on the first user selection and the retention mapping schedule, the retention label being defined in the retention schedule and having an expiration duration defining how long content items marked with the retention label are retained; storing the retention label as metadata for the content item; and deleting the content item after an expiration duration of the content item has elapsed.

In some examples, a computer storage medium having computer-executable instructions is provided. Upon execution by a processor of a computer, the instructions cause the processor to at least: identify a content item stored in a content items database; cause a user interface (UI) to be displayed on a user device, the UI includes a first list for a first categorization criterion, the first categorization criterion including one or more first criterion options selectable via the first list; receive first user input from the UI indicating a first user selection for the first categorization criterion, the first user selection being one of the one or more first criterion options; identify a retention mapping schedule, the retention mapping schedule maps the one or more first criterion options to retention labels of a retention schedule; determine a retention label for the content item based on the first user selection and the retention mapping schedule, the retention label being defined in the retention schedule and having an expiration duration defining how long content items marked with the retention label are retained; store the retention label as metadata for the content item; and delete the content item after an expiration duration of the content item has elapsed Alternatively, or in addition to the other examples described herein, examples include any combination of the following:

identifying a content item stored in a content items database;

causing a user interface (UI) to be displayed on a user device;

a UI includes a first list for a first categorization criterion;

a first categorization criterion includes one or more first criterion options selectable via the first list;

receiving first user input from the UI indicating a first user selection for the first categorization criterion;

a first user selection being one of the one or more first criterion options;

identifying a retention mapping schedule;

a retention mapping schedule that maps the one or more first criterion options to retention labels of a retention schedule;

determining a retention label for the content item based on the first user selection and the retention mapping schedule;

a retention label that is defined in the retention schedule and has an expiration duration that defines how long content items marked with the retention label are retained;

storing the retention label as metadata for the content item;

deleting the content item after an expiration duration of the content item has elapsed;

retaining the content item until after an expiration duration of the content item has elapsed;

the UI further includes a second list for a second categorization criterion;

the second categorization criterion including one or more second criterion options selectable via the second list;

the retention mapping schedule maps the one or more second criterion options to retention labels of the retention schedule;

determining a retention label for the content item is further based on a second user selection for the second categorization criterion;

the second user selection being one of the one or more second criterion options;

the first categorization criterion is a business function category;

first criterion options include a plurality of preconfigured business functions;

the second categorization criterion is a record type;

the one or more second criterion options include a plurality of preconfigured record types associated with a particular business function of the preconfigured business functions;

the UI automatically populates the one or more second criterion options in the second list upon receipt of the first user selection;

the one or more second criterion options are identified based on the first user selection;

the first categorization criterion is a business function category;

the one or more first criterion options include a plurality of preconfigured business functions;

the first categorization criterion is a region;

the one or more first criterion options include a plurality of regions;

each region of the plurality of regions identifying one of a geographic region, a jurisdictional region, and a political region;

a retention schedule includes one or more of a retention label, a retention type, a retention duration, a retention trigger, and a title;

each row in a retention schedule is associated with a unique retention label;

retention labels of the retention schedule are assigned to content items;

retention metadata is added to content items;

retention metadata includes one or more retention labels assigned to the associated content item;

content items include one or more of spaces and pages;

transmitting an alert message to a user within an amount of time before the deleting of a content item;

transmitting an alert message to a user within an amount of time before trashing a content item;

alert message is an email indicating an upcoming time when a content item is scheduled to be one or more of trashed and deleted;

alert message is a pop-up message displayed via a browser;

displaying a summary report grouping content items by retention label;

displaying a list of selectable retention labels;

receiving a selection of a retention label and assigning that selected retention label to a content item based on the selection;

displaying a report of content items assigned to a particular retention label;

displaying a selectable link of a page title, the selectable link causing the display of a content item when activated;

displaying a retention schedule administration screen that includes a list of retention labels;

displaying an administrative screen that accepts inputs for one or more of retention label, description, and a retention period, that upon completion causes a new retention label to be added to a retention schedule;

displaying a summary report that identifies a number of content items scheduled for one or more of trashing and deleting within an upcoming window of time; and a retention management server calculates an expiration time for a content item based on a duration of a retention label assigned to the content item and one or more of a creation date of the content item and a last modified date of the content item.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for adding record retention to content items; identifying a content item stored in a content items database; causing a user interface (UI) to be displayed on a user device, the UI includes a first list for a first categorization criterion, the first categorization criterion including one or more first criterion options selectable via the first list; receiving first user input from the UI indicating a first user selection for the first categorization criterion, the first user selection being one of the one or more first criterion options; identifying a retention mapping schedule, the retention mapping schedule maps the one or more first criterion options to retention labels of a retention schedule; determining a retention label for the content item based on the first user selection and the retention mapping schedule, the retention label being defined in the retention schedule and having an expiration duration defining how long content items marked with the retention label are retained; storing the retention label as metadata for the content item; and deleting the content item after an expiration duration of the content item has elapsed.

At least a portion of the functionality of the various elements in FIG. 1 to FIG. 16 can be performed by other elements in FIG. 1 to FIG. 16, or an entity (e.g., processor, web service, server, application program, computing device, etc.) not shown in FIG. 1 to FIG. 16.

In some examples, the operations illustrated in FIG. 17 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium has instructions recorded thereon which when executed by a computer device cause the computer device to cooperate in performing a method of generating dynamic incentives for instalment plan payments, the method comprising receiving a request for an installment payment plan incentive customized for a user in real-time from a requester via a network, the request associated with a transaction to purchase an item or service from a merchant; applying a set of user-configured rules to transaction data associated with the user and the transaction, the set of user-configured rules comprising a set of user-configured incentives criteria associated with the merchant or a lender; generating a dynamic incentive associated with the installment payment plan based on application of the set of user-configured rules to the transaction data, the dynamic incentive customized to the user; and transmitting the dynamic incentive to the requester, wherein the requester provides an offer to the user via a user interface device for acceptance or rejection, the offer comprising the installment payment plan and the dynamic incentive customized for the user in real-time during the transaction.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A content management system for adding record retention to content items stored in a content items database and deleting content items from the content items database upon retention expiration, the content management system comprising:

at least one processor; and at least one memory comprising computer-readable instructions, the at least one processor, the at least one memory and the computer-readable instructions configured to cause the at least one processor to:

identify a content item stored in the content items database, the content item including content data and content metadata;

cause a user interface (UI) to be displayed on a user device, the UI includes a first list for a first categorization criterion, the first categorization criterion including one or more first criterion options selectable via the first list;

receive first user input from the UI indicating a first user selection for the first categorization criterion, the first user selection being one of the one or more first criterion options;

identify a retention mapping schedule, the retention mapping schedule maps the one or more first criterion options to retention labels of a retention schedule;

determine a retention label for the content item based on the first user selection and the retention mapping schedule, the retention label being defined in the retention schedule and having a retention duration defining how long content items marked with the retention label are retained;

store the retention label as metadata for the content item;

based on a user modifying the content item, automatically reset the retention duration; and delete the content item from the content items database after the retention duration of the content item has elapsed.

2. The content management system of claim 1, wherein the computer-readable instructions are further configured to cause the at least one processor to:

generate an expiration report that identifies all content items scheduled to expire within a configurable expiration window, wherein the expiration report groups the contents items by retention category.

3. The content management system of claim 2, wherein the retention label further includes a soft enforcement type, wherein the soft enforcement type enables the user to manually delete the content item, even if a retention criteria of the content item has not yet been satisfied, wherein the soft enforcement type generates a warning message to the user when attempting to delete the content item before the retention duration has elapsed, and wherein the warning message displays remaining retention time.

4. The content management system of claim 2, wherein each row of the expiration report comprises a particular retention category, a retention duration for content items in the particular retention category, and a total number of content items in the particular retention category scheduled to expire within the configurable expiration window.

5. The content management system of claim 2, wherein the retention label further includes a hard enforcement type, wherein the hard enforcement type prevents the user from manually deleting the content item until after a retention criteria of the content item has been satisfied, and wherein attempted deletions generate an alert to an administrator.

6. The content management system of claim 4, wherein the expiration report links to a detailed expiration report for each retention category, wherein the detailed expiration report comprises: a title, a last modified date, a last modifier identifier, and an expiration date of each content item of the retention category.

7. The content management system of claim 6, wherein the detailed expiration report further comprises: an column with an identifier for a space to which the content item is assigned, a column with a retention category identifier, and a column with a description of the retention category.

8. A method for adding record retention to content items stored in a content items database and deleting content items from the content items database upon retention expiration, the method comprising:

identifying a content item stored in a content items database;

causing a user interface (UI) to be displayed on a user device, the UI includes a first list for a first categorization criterion, the first categorization criterion including one or more first criterion options selectable via the first list;

receiving first user input from the UI indicating a first user selection for the first categorization criterion, the first user selection being one of the one or more first criterion options;

identifying a retention mapping schedule, the retention mapping schedule maps the one or more first criterion options to retention labels of a retention schedule;

determining a retention label for the content item based on the first user selection and the retention mapping schedule, the retention label being defined in the retention schedule and having a retention duration defining how long content items marked with the retention label are retained;

storing the retention label as metadata for the content item;

based on a user modifying the content item, automatically resetting the retention duration; and deleting the content item from the content items database after the retention duration of the content item has elapsed.

9. The method of claim 8, further comprising generating an expiration report that identifies all content items scheduled to expire within a configurable expiration window, wherein the expiration report groups the contents items by retention category.

10. The method of claim 9, wherein the retention label further includes a soft enforcement type, wherein the soft enforcement type enables the user to manually delete the content item, even if a retention criteria of the content item has not yet been satisfied, wherein the soft enforcement type generates a warning message to the user when attempting to delete the content item before the retention duration has elapsed, and wherein the warning message displays remaining retention time.

11. The method of claim 9, wherein each row of the expiration report comprises a particular retention category, a retention duration for content items in the particular retention category, and a total number of content items in the particular retention category scheduled to expire within the configurable expiration window.

12. The method of claim 9, wherein the retention label further includes a hard enforcement type, wherein the hard enforcement type prevents the user from manually deleting the content item until after a retention criteria of the content item has been satisfied, and wherein attempted deletions generate an alert to an administrator.

13. The method of claim 11, wherein the expiration report links to a detailed expiration report for each retention category, wherein the detailed expiration report comprises: a title, a last modified date, a last modifier identifier, and an expiration date of each content item of the retention category.

14. The method of claim 13, wherein the detailed expiration report further comprises: an column with an identifier for a space to which the content item is assigned, a column with a retention category identifier, and a column with a description of the retention category.

15. A computer storage medium having computer-executable instructions that, upon execution by a processor of a computer, cause the processor to at least:

identify a content item stored in a content items database;

cause a user interface (UI) to be displayed on a user device, the UI includes a first list for a first categorization criterion, the first categorization criterion including one or more first criterion options selectable via the first list;

receive first user input from the UI indicating a first user selection for the first categorization criterion, the first user selection being one of the one or more first criterion options;

identify a retention mapping schedule, the retention mapping schedule maps the one or more first criterion options to retention labels of a retention schedule;

determine a retention label for the content item based on the first user selection and the retention mapping schedule, the retention label being defined in the retention schedule and having a retention duration defining how long content items marked with the retention label are retained;

store the retention label as metadata for the content item;

based on a user modifying the content item, automatically reset the retention duration; and delete the content item from the content items database after the retention duration of the content item has elapsed.

16. The computer storage medium of claim 15, further comprising instructions that, upon execution by a processor of a computer, cause the processor to at least:

generate an expiration report that identifies all content items scheduled to expire within a configurable expiration window, wherein the expiration report groups the contents items by retention category.

17. The computer storage medium of claim 16, wherein the retention label further includes a soft enforcement type, wherein the soft enforcement type enables the user to manually delete the content item, even if a retention criteria of the content item has not yet been satisfied, wherein the soft enforcement type generates a warning message to the user when attempting to delete the content item before the retention duration has elapsed, and wherein the warning message displays remaining retention time.

18. The computer storage medium of claim 16,
wherein each row of the expiration report comprises a
   particular retention category, a retention duration for
   content items in the particular retention category, and a
   total number of content items in the particular retention
   category scheduled to expire within the configurable
   expiration window.

19. The computer storage medium of claim 16,
wherein the retention label further includes a hard
   enforcement type,
wherein the hard enforcement type prevents the user from
   manually deleting the content item until after a reten-
   tion criteria of the content item has been satisfied, and
wherein attempted deletions generate an alert to an
   administrator.

20. The computer storage medium of claim 18,
wherein the expiration report links to a detailed expiration
   report for each retention category, wherein the detailed
   expiration report comprises: a title, a last modified date,
   a last modifier identifier, and an expiration date of each
   content item of the retention category.

\* \* \* \* \*